(12) United States Patent
Tinkler et al.

(10) Patent No.: US 9,384,678 B2
(45) Date of Patent: Jul. 5, 2016

(54) SYSTEM AND METHOD FOR GENERATING QUESTIONS AND MULTIPLE CHOICE ANSWERS TO ADAPTIVELY AID IN WORD COMPREHENSION

(75) Inventors: Marc Tinkler, New York, NY (US); Michael Freedman, Brooklyn, NY (US)

(73) Assignee: THINKMAP, INC., New York, NY (US)

( * ) Notice: Subject to any disclaimer, the term of this patent is extended or adjusted under 35 U.S.C. 154(b) by 351 days.

(21) Appl. No.: 13/075,973

(22) Filed: Mar. 30, 2011

(65) Prior Publication Data
US 2011/0257961 A1 Oct. 20, 2011

Related U.S. Application Data

(60) Provisional application No. 61/324,136, filed on Apr. 14, 2010.

(51) Int. Cl.
*G06F 17/27* (2006.01)
*G09B 19/04* (2006.01)
*G09B 7/06* (2006.01)

(52) U.S. Cl.
CPC . *G09B 19/04* (2013.01); *G09B 7/06* (2013.01)

(58) Field of Classification Search
CPC ............. G09B 7/00; G09B 7/02; G10L 15/18
USPC ................. 434/178, 236, 322, 323, 335, 350; 704/3, 10; 715/255, 731
See application file for complete search history.

(56) References Cited

U.S. PATENT DOCUMENTS

| | | |
|---|---|---|
| 4,244,580 A | 1/1981 | Hoyles |
| 4,775,956 A | 10/1988 | Kaji et al. |
| 4,862,408 A | 8/1989 | Zamora |
| 5,043,891 A | 8/1991 | Goldstein et al. |
| 5,371,673 A | 12/1994 | Fan |
| 5,537,317 A * | 7/1996 | Schabes et al. ................... 704/9 |
| 6,023,670 A | 2/2000 | Martino et al. |
| 6,120,297 A | 9/2000 | Morse, III et al. |
| 6,285,999 B1 | 9/2001 | Page |
| 6,308,149 B1 | 10/2001 | Gaussier et al. |
| 6,529,864 B1 | 3/2003 | Chase |
| 6,801,229 B1 | 10/2004 | Tinkler |
| 6,918,097 B2 | 7/2005 | Parisi |
| 7,010,751 B2 | 3/2006 | Shneiderman |
| RE39,090 E | 5/2006 | Beauregard et al. |
| 7,052,278 B2 | 5/2006 | Johnson et al. |

(Continued)

OTHER PUBLICATIONS

Yi-Chien Lin et al., "An Automatic Multiple-Choice Question Generation Scheme for English Adjective Understand", 2007, pp. 1-6.*

(Continued)

*Primary Examiner* — Douglas Godbold
*Assistant Examiner* — Mark Villena
(74) *Attorney, Agent, or Firm* — Kenyon & Kenyon LLP

(57) ABSTRACT

An adaptive learning system and method provides for automatically generating question types to a user for word comprehension and selecting multiple choice answers for display. Questions are developed for the user by obtaining online content and indexing the content into individual sentences and questions. The system provides questions in a series of rounds to the user and then adaptively tracks the progress of the user based on the categorization of each question.

36 Claims, 5 Drawing Sheets

(56) References Cited

U.S. PATENT DOCUMENTS

| | | | |
|---|---|---|---|
| 7,101,185 | B2 | 9/2006 | Budra et al. |
| 7,130,861 | B2 | 10/2006 | Bookman et al. |
| 7,136,876 | B1 | 11/2006 | Adar et al. |
| 7,177,797 | B1 | 2/2007 | Micher et al. |
| 7,489,819 | B2 | 2/2009 | Sheets |
| 7,647,345 | B2 | 1/2010 | Trepess et al. |
| 7,693,902 | B2 | 4/2010 | Kim et al. |
| 7,765,206 | B2 | 7/2010 | Hillis et al. |
| 7,840,893 | B2 | 11/2010 | Kulas |
| 7,853,544 | B2 | 12/2010 | Scott et al. |
| 7,890,886 | B2 | 2/2011 | Matthews et al. |
| 8,001,120 | B2 | 8/2011 | Todd et al. |
| 8,255,417 | B2 | 8/2012 | Nevill-Manning |
| 8,255,811 | B2 | 8/2012 | Lynn et al. |
| 8,311,808 | B2* | 11/2012 | Tinkler ............................ 704/10 |
| 8,442,423 | B1 | 5/2013 | Ryan et al. |
| 8,491,311 | B2 | 7/2013 | Bodner et al. |
| 8,568,144 | B2* | 10/2013 | Morrison et al. ............. 434/178 |
| 2002/0103820 | A1 | 8/2002 | Cartmell et al. |
| 2002/0107692 | A1 | 8/2002 | Litovsky |
| 2002/0115048 | A1* | 8/2002 | Meimer ........................ 434/322 |
| 2003/0041307 | A1 | 2/2003 | Park |
| 2003/0044760 | A1* | 3/2003 | Banerjee et al. ............. 434/350 |
| 2003/0050929 | A1 | 3/2003 | Bookman et al. |
| 2003/0060250 | A1 | 3/2003 | Chan |
| 2003/0152904 | A1 | 8/2003 | Doty, Jr. |
| 2003/0171949 | A1 | 9/2003 | Degnan et al. |
| 2004/0073866 | A1* | 4/2004 | Kunzel .......................... 715/500 |
| 2004/0189696 | A1 | 9/2004 | Shirriff |
| 2004/0259062 | A1* | 12/2004 | Heller et al. .................. 434/236 |
| 2004/0267607 | A1* | 12/2004 | Maddux ......................... 705/11 |
| 2005/0004949 | A1 | 1/2005 | Trepess et al. |
| 2005/0037324 | A1* | 2/2005 | Sumimoto .................... 434/322 |
| 2005/0086188 | A1* | 4/2005 | Hillis et al. ..................... 706/50 |
| 2005/0108001 | A1 | 5/2005 | Aarskog |
| 2005/0171760 | A1 | 8/2005 | Tinkler |
| 2005/0255438 | A1* | 11/2005 | Manos .......................... 434/323 |
| 2006/0024654 | A1 | 2/2006 | Goodkovsky |
| 2006/0101012 | A1 | 5/2006 | Carson et al. |
| 2006/0121432 | A1* | 6/2006 | Sun ............................... 434/322 |
| 2006/0155528 | A1* | 7/2006 | Higgins ........................... 704/3 |
| 2006/0161423 | A1 | 7/2006 | Scott et al. |
| 2006/0172276 | A1 | 8/2006 | Higgins et al. |
| 2006/0240394 | A1* | 10/2006 | Smith et al. ................... 434/322 |
| 2006/0240851 | A1 | 10/2006 | Washburn |
| 2006/0242576 | A1 | 10/2006 | Nagel et al. |
| 2006/0277046 | A1* | 12/2006 | Lachish et al. ................ 704/272 |
| 2007/0011005 | A1 | 1/2007 | Morrison et al. |
| 2007/0050393 | A1* | 3/2007 | Vogel et al. ................... 707/102 |
| 2007/0072164 | A1* | 3/2007 | Katsuyama et al. ........... 434/353 |
| 2007/0112554 | A1* | 5/2007 | Goradia ............................ 704/4 |
| 2007/0172808 | A1* | 7/2007 | Capone ......................... 434/350 |
| 2007/0209004 | A1* | 9/2007 | Layard .......................... 715/731 |
| 2007/0282826 | A1 | 12/2007 | Hoeber et al. |
| 2008/0213020 | A1* | 9/2008 | Kunzel ............................ 400/76 |
| 2008/0228906 | A1 | 9/2008 | Yerubandi et al. |
| 2008/0259022 | A1 | 10/2008 | Mansfield et al. |
| 2008/0310723 | A1 | 12/2008 | Manu et al. |
| 2008/0318200 | A1 | 12/2008 | Hau et al. |
| 2009/0030891 | A1* | 1/2009 | Skubacz et al. .................. 707/5 |
| 2009/0035733 | A1 | 2/2009 | Meitar et al. |
| 2009/0070111 | A1* | 3/2009 | Bajaj et al. .................... 704/251 |
| 2009/0094233 | A1 | 4/2009 | Marvit et al. |
| 2009/0098516 | A1* | 4/2009 | Chiarelli ....................... 434/167 |
| 2009/0197225 | A1 | 8/2009 | Sheehan et al. |
| 2009/0253112 | A1* | 10/2009 | Cao et al. ...................... 434/322 |
| 2010/0010977 | A1 | 1/2010 | Choi et al. |
| 2010/0035225 | A1* | 2/2010 | Kerfoot, III ................... 434/335 |
| 2010/0058226 | A1 | 3/2010 | Flake et al. |
| 2010/0081120 | A1* | 4/2010 | Nanjiani et al. ............... 434/322 |
| 2010/0162168 | A1 | 6/2010 | Lee et al. |
| 2010/0203492 | A1* | 8/2010 | Nibe et al. ..................... 434/362 |
| 2010/0211896 | A1 | 8/2010 | Brown |
| 2010/0273138 | A1* | 10/2010 | Edmonds ................. G09B 7/00 434/322 |
| 2010/0293162 | A1 | 11/2010 | Odland et al. |
| 2011/0123967 | A1* | 5/2011 | Perronnin et al. ............. 434/178 |
| 2011/0125734 | A1* | 5/2011 | Duboue et al. ................ 707/723 |
| 2011/0136094 | A1 | 6/2011 | Weiler |
| 2011/0144978 | A1 | 6/2011 | Tinkler |
| 2012/0053926 | A1 | 3/2012 | Satpute |

OTHER PUBLICATIONS

International Search Report and Written Opinion of the International Searching Authority in PCT/US2012/031184, report dated Jun. 22, 2012.

Jonathan Brown et al., "*Retrieval of Authentic Documents for Reader-Specific Lexical Practice*," Proceedings of InSTIL/ICALL 2004, Symposium on Natural Language Processing and Speech Technologies in Advanced Language Learning Systems, Jun. 2004.

Jonathan C. Brown et al., "*Automatic Question Generation for Vocabulary Assessment*," Proceedings of HLT/EMNLP 2005, Human Language Technology Conference and Conference on Empirical Methods in Natural Language Processing, Oct. 2005, pp. 819-826.

Dan Gillick, "*Sentence Boundary Detection and the Problem with the U.S.*," Proceedings of NAACL HLT 2009, Annual Conference of the North American Chapter of the Association for Computational Linguistics: Human Language Technologies, Short Papers, Jun. 2009, pp. 241-244.

Ayako Hoshino and Hiroshi Nakagawa, "*A Cloze Test Authoring System and its Automation*," Proceedings of ICWL 2007, 6th International Conference on Web-based Learning: Advances in Web-based Learning, Aug. 2007, vol. 4823, pp. 252-263.

Wayne Porter, "*Amazon SIPs—SIPs are Statistically Improbable Phrases in Books and more*," posted Oct. 26, 2006, retrieved from http://www.wayneporter.com/?p=156 on Dec. 17, 2009, 7 pages.

Diego Puppin, "Inside Google Books: Explore a Bookin 10 Seconds," posted Jul. 1, 2009, retrieved from http://booksearch.blogspot.com/2009/06/explore-book-in-10-seconds.html on Dec. 17, 2009, 4 pages.

WordSift—Visualize Text Website, "*About*," "*Features*," "*Background Theory*," "*Word Lists*," "*Tips*," *and* "*Acknowledgments*" sections, retrieved from http://www.wordsift.com/ on Dec. 17, 2009, 19 pages.

Hakuta et al., "Wordsift: Using Computer-Assisted Language Learning to Increase ELs' Math and Science Literacy", Web Presentation for the National Clearinghouse for English Language Acquisition, Sep. 24, 2009, 18 pages, available at www.ncela.gwu.edu/files/webinars/13/Hakuta_Roman_Sep09.pdf.

Wientjes, Greg, www.wordsift.com, accessed Jan. 20, 2009, 7 pages.

Coxhead, Averil, "An Introduction to the Academic Word list," ELI Occasional Publication 18, Victoria, University of Wellington, New Zeland, 1998, pp. 1-9.

International Search Report and Written Opinion of the International Searching Authority in counterpart International Application No. PCT/US12/069174, 12 pages.

* cited by examiner

SYSTEM AND METHOD FOR GENERATING QUESTIONS AND MULTIPLE CHOICE ANSWERS TO ADAPTIVELY AID IN WORD COMPREHENSION

CROSS-REFERENCE TO RELATED APPLICATIONS

This application claims the benefit, under 35 U.S.C. §119(e), of U.S. Provisional Patent Application No. 61/324,136, filed on Apr. 14, 2010, which is herein incorporated by reference in its entirety.

FIELD OF THE INVENTION

The present invention relates to a system and method for automatically generating various question types, including automatic selection of multiple choice answers for display. The present invention further relates to a system and method for selecting presentable multiple choice answers based on use of a word in a sentence, quality of a sentence, and frequency of use of the word in other sentences. The present invention further relates to an adaptive learning system which aids a user in word comprehension by asking questions in a series of rounds and then tracking the progress of the user based on the categorization of each question.

BACKGROUND INFORMATION

Particularly effective methods for improving grammatical skill include having an individual actively complete sentences by filling in blank portions of the sentences or be tested on the definition, synonym, and/or antonym of a given word. Such activities are also often used to test grammatical skill. For example, a user, such as a test taker, may be provided with a set of possible choices of words for selection to fill in the blank portion of, and thereby complete, the sentence. Such fill-in sentences are currently manually compiled, which entails a tedious process.

Additionally, a test taker can be asked a number of questions about given words, including, to provide a definition for a given word based on a list of choices for definitions, or providing a synonym or antonym for that word. After a test taker answers a question, the test taker moves on to answer a new question about another word. Although a test taker may answer a question correctly, the test taker might not fully understand the definition or etymology of a word, or might have guessed to arrive at a given answer. Thus, in these antiquated tests or programs, a test taker may be given a false sense that the test taker fully understands a word, when in fact the test taker does not. A test taker is not provided the opportunity to be subsequently tested on a given word after test completion, to ensure that the test taker understands all definitions and uses of the given word, and has mastered knowledge of a word. Further, a test taker does not have an opportunity to adapt questions asked based on the test taker's level of vocabulary comprehension and ability.

DETAILED DESCRIPTION

Example embodiments of the present invention provide a vocabulary learning and testing environment to facilitate word and vocabulary comprehension, in which a system and/or method automatically generates questions and answer choices from designated sentences or words, and adapts future outputted questions based on selections of answer choices by the user/test-taker.

In example embodiments of the present invention, a system and method provides for an adaptive learning system where questions to a user may be adapted to an individual user, by asking a user questions in a series of rounds and then tracking the progress of the user based on the categorization of each question.

According to an example embodiment of the present invention, a system and method automatically compiles partially blank fill-in sentences which may be used, for example, to hone and/or test grammatical skill.

According to an example embodiment of the present invention, a system and method automatically selects for output a set of possible text strings, each including one or more words, which may be selected by a user for completing partially blank fill-in sentences.

According to an example embodiment of the present invention, a system and method automatically selects for output a set of possible text strings, each including one or more words, which may be selected by a user to indicate that it is a synonym of a designated word displayed to the user.

According to an example embodiment of the present invention, a system and method automatically selects for output a set of possible text strings, each including one or more words, which may be selected by a user to indicate that it is an antonym of a designated word displayed to the user.

According to an example embodiment of the present invention, a system and method automatically selects for output a set of possible text strings, each including one or more words, which may be selected by a user to indicate that it is a definition of a designated word displayed to the user.

According to an example embodiment of the present invention, a system and method provides a sentence including a designated word displayed to the user and automatically selects for output a set of possible text strings, each including one or more words, which may be selected by a user to indicate that it is a synonym of the designated word in the context of the sentence.

According to an example embodiment of the present invention, a system and method provides a sentence including a designated word displayed to the user and automatically selects for output a set of possible text strings, each including one or more words, which may be selected by a user to indicate that it is a definition of the designated word in the context of the sentence.

Figure 1:
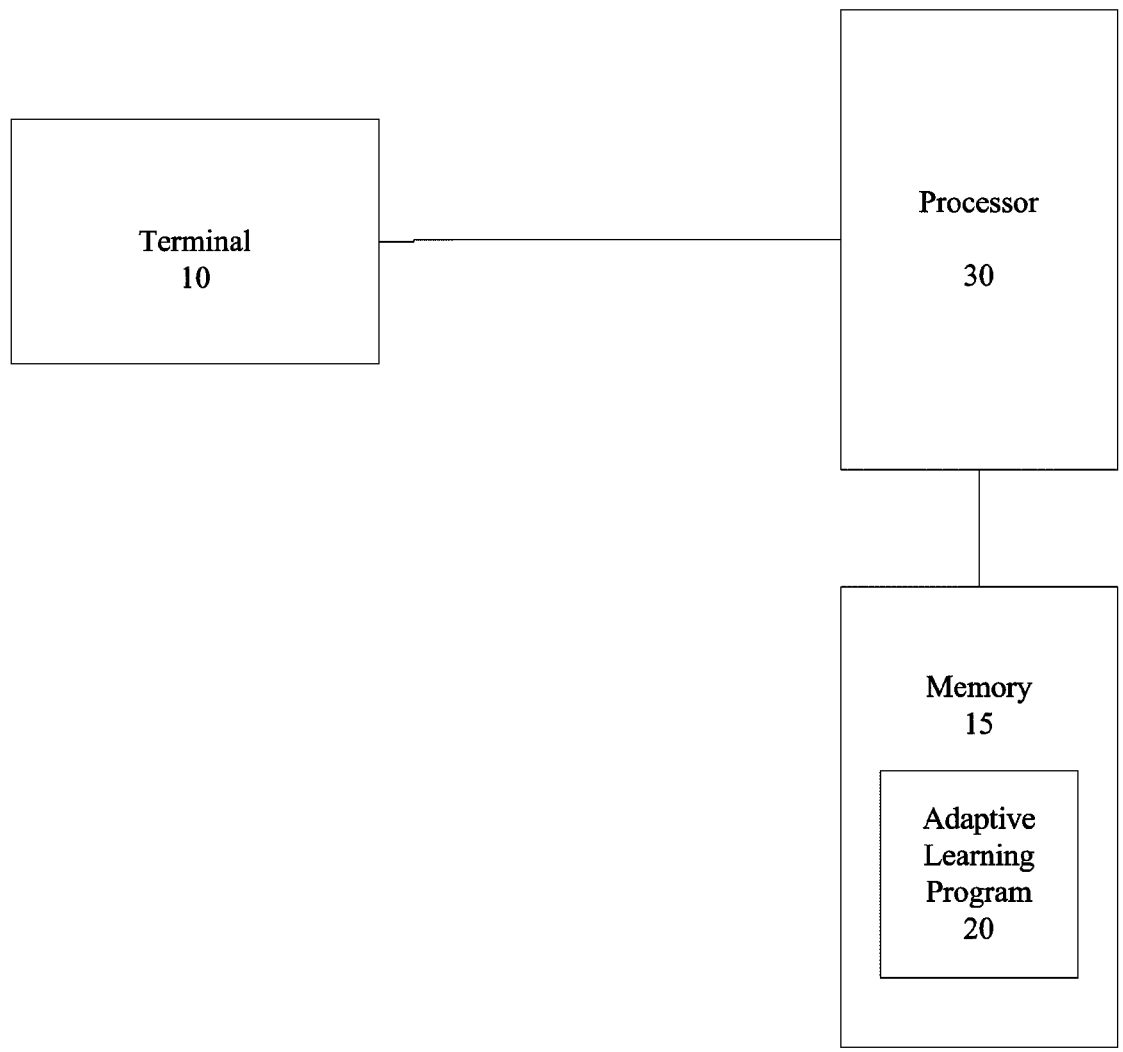
FIG. 1 is a block diagram of an adaptive learning system, according to an example embodiment of the present invention.

FIG. 1 illustrates a diagram of a terminal 10 displaying a user interface of adaptive computer learning program 20 stored in a memory 15, accessible by a processor 30, according to an example embodiment of the present invention. Adaptive learning program 20 may be executed by processor 30 and may result in an output to be displayed on terminal 10 to a user. Terminal 10 may be a computer monitor, or any other display device which may depict adaptive learning program 20 during execution.

Processor 30 may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. Processor 30 may also be embodied in a server or user terminal or combination thereof.

The components of FIG. 1 may be embodied in, for example, a desktop, laptop, hand-held device, Personal Digital Assistant (PDA), television set-top Internet appliance, mobile telephone, smart phone, etc., or as a combination of one or more thereof. The memory 15 may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more hardware computer-readable media, e.g., as described above, having stored thereon instructions executable by processor 30 to perform the methods described herein.

An example embodiment of the present invention is directed to a method, e.g., of a hardware component or machine, of transmitting instructions executable by processor 30 to perform the methods described herein.

Various methods and embodiments described herein may be practiced separately or in combination.

Figure 2:
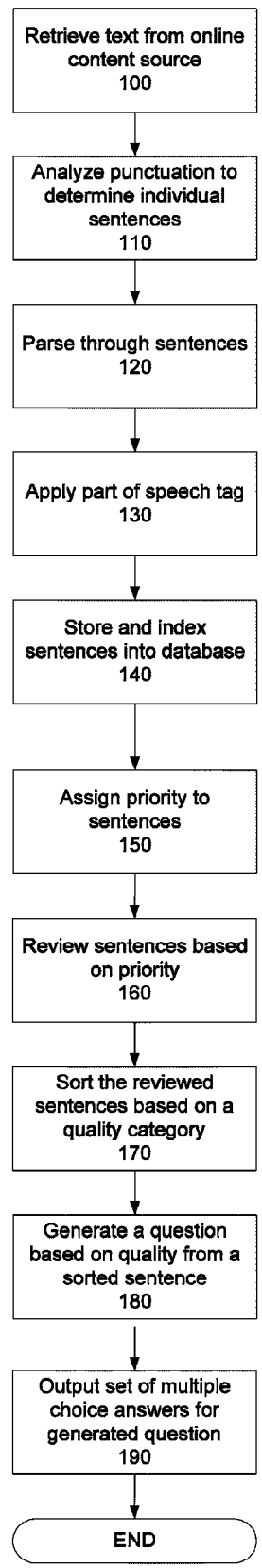
FIG. 2 is a flow diagram of a process of generating questions and multiple choice answers from retrieved text, according to an example embodiment of the present invention.

FIG. 2 is a flowchart that illustrates an example process of generating questions and multiple choice answers from retrieved text. In an example embodiment, in step 100, one or more servers may obtain text from Internet content and generate questions based on sentences from the text. For example, for fill-in sentence question types, these sentences may be made by removing, for completion by a user, a portion of each of one or more of sentences of the obtained text. For synonym, antonym, and definition type questions, individual words may be extracted from the text. Synonym hint and definition hint questions may provide an unobstructed sentence which may provide an unclear meaning of a highlighted word in a provided sentence.

For example, the server(s) may be subscribed to web content syndication (RSS) feeds, such as RDF Site Summary, Rich Site Summary, or Really Simple Syndication feeds, of major newspapers and periodicals, and may use text from such feeds for generating the fill-in sentences and other sentence questions.

Internet articles obtained, for example from RSS feeds, typically take the form of a Hyper Text Markup Language (HTML) document. In an example embodiment of the present invention, the system and method parses the HTML document into an eXtensible Markup Language (XML) Document Object Model (DOM), including a hierarchy of nodes and attributes which may be programmatically examined for analyzing the text for boilerplate language. For example, the system and method may compute a respective hash code for each node of the XML DOM based on the text contained in the respective node (including the text of all of the node's child nodes), which hash codes may be used for the analysis as described in further detail below.

In step 110, the system and method may analyze punctuation marks of the obtained text to determine the boundaries of sentences within the text. For example, at least initially, each punctuation mark (even those that are not usually used to end a sentence, e.g., a comma) may be considered a sentence boundary. In step 120, the system and method may then further analyze words surrounding the punctuation marks and discard the punctuation mark as a sentence boundary where the surrounding words satisfy certain predetermined conditions. For example, where "Mr" precedes a period, the system and method remove that period as a sentence boundary. In an example, a further condition may be required with respect to the preceding example that the period also be followed by a proper name for its removal from consideration as a sentence boundary.

In step 130, the system and method may apply a part-of-speech (POS) tagger to identify the POS (e.g., noun, verb, adjective, etc.) for each word in each of the obtained sentences, and may store POS tags for each of the words identifying the respective POS of the word.

The system and method may store the POS parsed sentences in a database of one or more indices in step 140. For example, the system and method may index the sentences by included words and POS of those words. In an example embodiment, certain words, such as "a," "the," "it," etc., may be discarded from use for indexing the sentences. In an example embodiment, the indexing of sentences may be by only those words that are found in, or are associated with, those words found in (as explained below), a designated electronic dictionary.

In an example embodiment, the system and method may look up the indices for those sentences which include those certain words, for example, having the POS of those certain words. For example, where the word "store" as a noun (a mercantile establishment for the retail sale of goods or services) is selected, the system and method may obtain an indexed sentence including the word store used as a noun, and where the word "store" as a verb (keep or lay aside for future use) is selected, the system and method may obtain an indexed sentence including the word store used as a verb.

The system and method may include or provide a user interface, e.g., the user interface of adaptive learning program 20, by which the system and method may receive input of selected words to be tested. Alternatively, the words may be ranked by difficulty, and, for a selected difficulty level, the system may automatically select, e.g., randomly, words from a corpus assigned the selected difficulty, and then select sentences for those words, e.g., randomly from a set of highly ranked sentences, whose ranking may be as described in detail below with respect to an example embodiment. Alternatively, the questions as a whole may be ranked by difficulty and/or by ability to discriminate between different skill levels of test takers, and may be selected based on the actual or expected skill level of the test taker and/or the ability to discriminate between skill level on the basis of the sentence.

In an example embodiment of the present invention, the system and method may automatically identify portions of the obtained text which is boilerplate language, and may weed those textual portions out, so that they are not indexed. For example, the system and method may store obtained text in a boilerplate database. As new text is obtained, the new text may be compared to the text in the boilerplate database. If there is a match, the text may be discarded and not indexed. (The text may remain in the boilerplate database for comparison to later obtained text.) In an example embodiment, the system and method may maintain a counter for each textual component of the boilerplate database, and increment the counter each time a match is found. According to this example, the text may be discarded conditional upon that the counter value is at least a predetermined threshold value.

In an example embodiment, the boilerplate removal may be on a sentence by sentence basis, so that text is discarded as boilerplate only if the entire sentence meets the conditions for discarding.

In an alternative example embodiment of the present invention, the boilerplate removal may be on a node by node basis (described in detail below). For example, a block of text may correspond in its entirety to a first node, and subsets of the text block may correspond to respective nodes of lower hierarchical level than the first node, which lower-level node may include even lower level nodes, etc. Accordingly, even where the boilerplate analysis provides for discarding text corresponding to a particular node determined to be boilerplate, the text may nevertheless remain in the database of indices as part of a larger portion of text.

In an example embodiment of the present invention, the system and method may timestamp each received text. In an embodiment, the system and method may condition the discarding of the text on repeated occurrence of the text within a predetermined period of time. For example, if the second occurrence occurred more than a predetermined amount of time after the prior occurrence of the text, then the system and method would not discard the text on the basis of that repeated occurrence of the text. Different time periods may be used for different sources, for example, depending on the respective frequencies at which text is obtained from the respective sources.

The timestamp may instead or additionally be used as a basis for clearing out stale data from the boilerplate database. For example, if text initially is obtained once every three days, the text would be stored in the boilerplate database, and whenever new text matching the boilerplate text is obtained, the system and method would refrain from including the text in the indices database, based on its match to the text of the boilerplate database. If, subsequently, the system and method ceases to receive the text, e.g., from the source with which the boilerplate text is associated, for an extended period of time, e.g., two weeks, measured based on the timestamp of the last receipt of the text, it may be assumed that the boilerplate text is no longer being used, e.g., by the source, and the system and method may therefore be configured to remove the text from the boilerplate database.

In an example embodiment of the present invention, if the identified boilerplate text has already been stored in the indices database, the system and method may remove the text from the indices database.

In an example embodiment, for each source, the system and method may refrain from storing any of the obtained text in the indices database until a minimum amount of text or number of articles have been obtained from the source and analyzed for boilerplate. Once a threshold of text or articles have been analyzed for boilerplate, newly obtained text and/or the previously obtained text not identified as boilerplate may be indexed.

In an example embodiment of the present invention, the system and method may maintain a separate collection of text in the boilerplate database for each different source from which the system and method obtains text. For example, each obtained text may be tagged with a source identifier, e.g., NYT for New York Times, or a separate database may be used for each different source.

In an example embodiment of the present invention, the system and method may perform the boilerplate analysis based on a hash code, a hierarchical level of the text, the identified content source, and/or a timestamp that indicates the previous occurrence of the text. Use of the source identification and timestamp are described above. The hash code may be generated for each obtained text block based on the content of the text block. For each newly obtained text, the system and method may calculate a respective hash code and compare the hash code to a set of hash codes stored in the boilerplate database. The text may be determined to be identical to previously obtained text where the hash codes match. As explained above, this may be done on a source-by-source basis. Accordingly, it may be unnecessary to store the complete text in the boilerplate database, the hash codes being stored in the boilerplate database instead. Alternatively, the text may be maintained in the boilerplate database at least until it is determined that the text is in fact boilerplate text or until enough text has been analyzed to store the text in the indices database, where the text has not been identified as boilerplate text.

In an example embodiment of the present invention, the hash code may be generated by input of the text into a hashing algorithm. The system and method may use any suitably appropriate hashing algorithm, e.g., MD5 or CRC32.

In an example embodiment of the present invention, the matching of hashing codes may be one of a plurality of factors used for determining whether text is boilerplate. Different factors may be given different weights. For example, an additional factor the system and method may consider is the hierarchical position of the node and whether the hierarchical level of the node of the newly obtained text matches or is close to (determined using a suitably appropriate near-duplicate determination method) that of the text of the boilerplate database. In an example embodiment, the system and method may further generate a string that represents the respective node's unique place in the DOM hierarchy. An example string may be "HTML/Body/P5," which indicates that the text was found in the fifth paragraph of the body portion of an HTML document. The boilerplate text may have occurred, for example at "HTML/Body/P3," in which case the system and method may determine whether the new text is boilerplate based on its positional removal from the boilerplate text by only two paragraphs.

As noted above, the indexing of sentences in step 140 may be by only those words that are found in, or are associated with those words found in, a designated electronic dictionary. The sentences may include variations of the words of the dictionary, whose precise form is not included in the dictionary. Accordingly, in an example embodiment of the present invention, for those sentences which have not been determined to be boilerplate, the system and method may index the sentence by those words of the sentence which are in the electronic dictionary. For those words not in the electronic dictionary, the system and method may determine whether the words include any of a predetermined set of common suffixes. Where a word includes such a suffix, the system and method may stem the word using a stemming algorithm, that may be structured in accordance with grammatical rules and that may vary by POS, to obtain a base word, which base word the system and method may compare to the words of the dictionary. For example, the base word may be obtained merely by removing the suffix or by removing the suffix and adding a letter. Where the base word matches a word of the dictionary, the system and method may index the sentence by the base word. In an example embodiment, the system and method may do the same for prefixes. In an alternative example embodiment, words modified by a prefix may be stored in the electronic dictionary as a separate word independent of the word without the prefix, and the stemming algorithm may accordingly not be applied to stem prefixes.

In another alternative example embodiment, a combination of automatic quality scoring and manual sorting may be used. For example, the system and method may automatically assign a quality score. Those sentences assigned a quality score that does not satisfy a predetermined threshold quality score are not provided for the manual sort and are therefore not output to a user for sentence completion. The automatic scoring may be performed prior to indexing, and the system and method may refrain from indexing those sentences assigned a quality score that does not satisfy the predetermined threshold quality score. Those sentences assigned a quality score that does satisfy the predetermined threshold quality score may then be output to a reviewer for manual review and assignment to one of the quality categories.

In an example embodiment of the present invention, the system and method may automatically assign a quality score to each of the sentences. The sentences may be automatically grouped into sentence quality categories based on the assigned quality scores in step 170. For example, each quality category may correspond to a respective interval of quality scores.

For example, the system and method may analyze each sentence with respect to various parameters, which parameters may be assigned different weights in an equation that produces the quality score. A non-exhaustive list of parameters which may be considered includes the number of proper nouns the sentence includes and/or the ratio of proper nouns to other nouns or words of the sentence, whether the sentence contains unbalanced quotes (e.g., an open quotation mark without a close quotation mark), the number of non-alphanumeric characters (e.g., parenthesis, punctuation, etc.) and/or ratio of such characters to alphanumeric characters, the length of the sentence, whether the sentence ends without a standard ending punctuation mark, whether the sentence begins with character other than a letter or quotation mark, the number of acronyms in the sentence and/or the ratio of acronyms to other words of the sentence, the number of capitalized words and/or the ratio of capitalized words to other words of the sentence, and whether the sentence begins with a preposition.

For example, the larger the number of proper nouns, the larger the number of non-alphanumeric characters, the larger the number of acronyms, the larger the ratio of proper nouns to other nouns and/or words of the sentence, the larger the ratio of non-alphanumeric characters to alphanumeric characters, the larger the ratio of acronyms to other words of the sentence, the larger the number of capitalized words, and/or the larger the ratio of capitalized to other words of the sentence, the worse the score may be. Inclusion of unbalanced quotation marks, a non-standard ending punctuation mark, a beginning character other than a letter or quotation mark, and/or a preposition as the first word of the sentence may also reduce the score. The score may also be reduced proportionate to a length by which the sentence exceeds and/or falls short of a predetermined ideal sentence length.

According to the example embodiment in which sentences are manually reviewed, the system and method may produce a large corpus of sentences to be manually reviewed for quality by a reviewer. In an example embodiment, the system and method may therefore prioritize the sentences in step 150 to be manually reviewed and output the sentences to the reviewer in order of the priorities, so that the most highly prioritized sentences are reviewed in step 160 and made available for output to a user before sentences of lower priority.

The sentence priorities assigned may be based on priorities of the words of the dictionary included in the sentences, such that the higher the priority of words which a sentence includes, the higher the priority of the sentence. Where the highest priority words of two sentences are of the same priority, the sentence including the larger number of words of such priority may be ranked higher. Where the number of such words is equal, the next highest priority words of the sentence may be considered for prioritizing one of the two sentences ahead of the other. Where all word priorities of two sentences are equal, the sentences may be assigned the same priority values. In alternative example embodiments, other ranking equations may be used for ranking sentences based on priorities of the words of the sentences. For example, the system and method may add the priorities of each sentence and divide the total priority value by the number of words or prioritized words of the sentence to obtain an average that the system and method may use.

In an example embodiment of the present invention, the system and method may use one or more of the following factors for prioritizing the words, on whose basis the sentences may, in turn, be prioritized: a likelihood of a word to appear in a standardized test, for example, determined based on analysis of a corpus of standardized tests, such as the SAT or GRE, where the higher the likelihood, the higher the priority; how often a word is looked up on dictionary web sites, where the more the word is looked up, the higher the priority; whether a sentence has already been made available for output for a word, where, if a sentence has not yet been made available for the word, the word is ranked higher; and whether a sentence has already been made available for a particular sense of the word, where, if a sentence has not yet been made available for the particular sense of the word, the word, e.g., with respect to the particular sense, is ranked higher. The likelihood of the appearance of a word in a standardized test may be manually input into the system. Alternatively, whether a sentence has already been output for review for a particular word or particular sense of the word may be considered. With respect to how often a word is looked up, the system and method may maintain a dictionary website which may be accessed for looking up the meaning of a word, and may maintain a record of the number of times each of the words is looked up. Alternatively or additionally, the system and method may obtain such records from external dictionary websites.

Based on the priorities of the words, the words may be placed into a queue. The system and method may sequentially traverse the queue of words, and, for each traversed word, search for a sentence associated with the word, and, if such a sentence is found, output the sentence for review. After output of the sentence for review or after review of the sentence, the word may be placed at the back of the queue.

In an alternative example embodiment, the system and method does not sequentially traverse the queue. Instead, position in the queue may be used as a priority factor to be considered along with all other priority factors, where the highest priority words are selected.

In an alternative example embodiment, for a particular word for which a sentence has been reviewed, the number of other words that have been reviewed since the review of the sentence for the particular word may be considered as a factor for determining the word's priority, and the overall priority may decide the word's position in a queue.

In an example embodiment, where a word has a number of senses (different meanings), and a sentence has been reviewed for only one of the plurality of word/sense pairs of the word, the system and method may consider the word as not having been reviewed. Alternatively, that a word has a plurality of word/sense pairs may reduce the impact of a review of a sentence for a single one of the word/sense pairs on the priority of the word in the queue.

In an example embodiment of the present invention, after all sentences available for a given word are reviewed, the word may be removed from the queue, and those words not in the queue may be assigned NULL or its equivalent for its priority. When new text is obtained that includes the word, the word may then be re-inserted into the queue.

More than one reviewer may review the sentences. The reviewers may use different workstations at which the sentences are output. The system and method may divide the sentences to be reviewed between the various reviewers, e.g., which may be signed into the system, and output different ones of the sentences to the different workstations at which the different reviewers are signed in.

A reviewer may assign a sentence to a quality category, in step 170, such as "excellent," "good," or "bad." For example, a reviewer may designate a sentence as being of "excellent" quality if the word appears in a manner consistent with the word/sense pair, where the word may be determined from the context of the sentence. In an example embodiment, a reviewer may designate a sentence as excellent if it is used in a sentence that provides a context that may clue the reader in on the definition of the word. For example, the sentence "Albert applied a liberal amount of suntan-lotion so that it was ensured that every inch of his torso was covered by multiple layers of suntan-lotion" may be designated as excellent because it suggests the definition for the word "liberal," in contrast to, for example, the sentence, "Albert applied a liberal amount of suntan lotion," which provides less contextual information usable as a suggestion of the definition.

Figure 3:
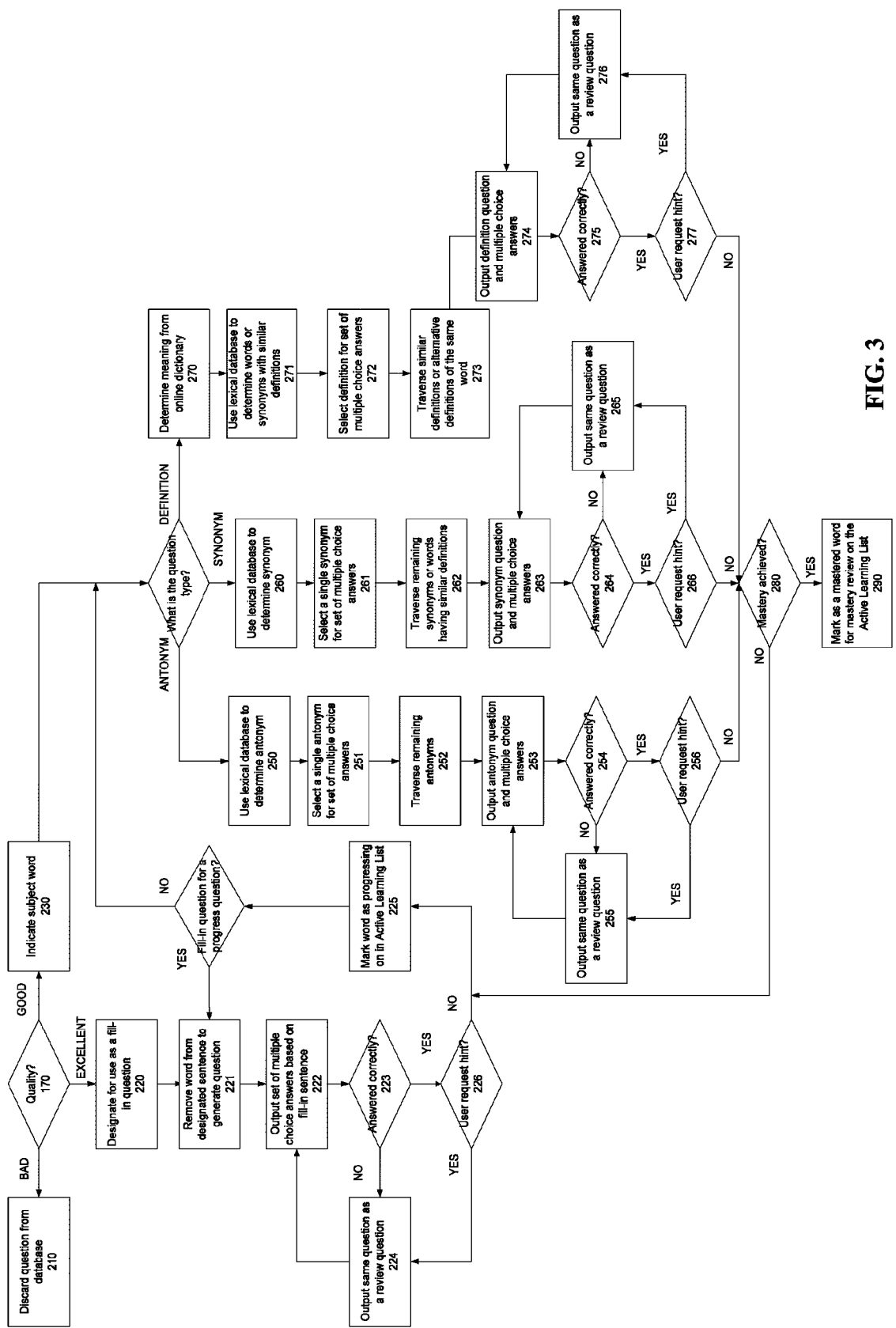
FIG. 3 is a flow diagram of a process of determining questions and multiple choice answers in accordance with a determined question category, according to an example embodiment of the present invention.

FIG. 3 illustrates a process of determining questions and multiple choice answers to output in accordance with a determined question category. After sentence quality is determined in step 170, questions may be provided to the user. For example, a sentenced designated as excellent may subsequently be designated for use as a fill-in the blank question in step 220. Conversely, a sentence designated as "good" in step 170 may not be used as a fill-in the blank question because it does not provide sufficient contextual information to suggest the definition with the removal of a word. A sentence designated as "good" may be used to help generate other question types, such as synonym, antonym, and definition questions.

A designation of a good classification may be used in instances where a word appears in a way consistent with the target word/sense pair, but the context of the entire sentence is insufficient to allow for a determination of the definition of the word. In an example embodiment, the system and method may be configured such that sentences designated as good are not used as fill-in the blank questions. Such sentences may be used for other question types where the word is included in the output sentence provided for the question, e.g., synonym, antonym, or definition questions. The system and method may, in step 230, indicate, e.g., by highlighting, which of the included words is the subject of the question.

A reviewer may also designate a question as "bad." A sentence classified as bad may, for example, contain an error or a typo, or may use jargon in the context of the sentence. A sentence classified as bad may also use the word in a manner that is inconsistent with the word/sense pair or may use the word according to an incorrect definition. In an example embodiment, the system and method may be configured not to use any sentences classified as bad for any of the question types and to discard the sentence in step 210.

The reviewer may also tag the correct sense, i.e., meaning, of the relevant word in the sentence. For example, for the noun "store" in a particular sentence, the reviewer may input whether the word, for example, is intended to mean "a mercantile establishment for the retail sale of goods or services" or "a stock of something," which tagged sense may be used for the indexing of the sentence.

Referring again to FIG. 2, and as noted above, the system and method may provide for a number of question types in step 180 including fill-in sentence questions, questions asking about the synonym of a designated word, questions asking about the antonym of a designated word, and questions asking about the definition of a designated word. The system and method may output a set of multiple choice answers in step 190 from which the user may choose.

For example, the system and method may output a set of multiple choice answers in step 190 from which the user may select one for completing a fill-in sentence that has been output in step 180.

Referring again to FIG. 3, in an example embodiment, where a fill-in sentence question is provided to the user, the system and method may remove the selected word from a designated sentence in step 221, insert a, e.g., underlined, blank space, and output the modified sentence. The system and method may include the word that had been removed from the sentence, i.e., the correct answer, as one of the answer choices, and may, in step 222, automatically select a predetermined number of wrong answers for inclusion as the other choices for the fill-in sentence. If a user does not answer the question correctly in step 223, they may encounter the question again in step 224.

In an example embodiment of the present invention, the system and method may analyze a large corpus of words, on the basis of which analysis the system may select the wrong words for the fill-in the blank question. The analysis may be of factors including, the POS of the word, similarity of meaning to the correct word, similarity of use to the correct word, similarity of frequency of use to the correct word, and/or skill level.

For example, the system and method may analyze the corpus of words with respect to a combination of the above-enumerated factors. For example, in an instance where three incorrect words are presented as choices together with the correct word for a fill-in the blank question, the system and method may select three words having the same POS as that of the correct word, having a meaning dissimilar by a predetermined quantification to the correct word, a use with similar characteristics as those of the correct word, a closest frequency of use to the correct word, and a predetermined threshold skill level.

In an example embodiment, with respect to similarity of meanings, the system and method may query a corpus of words, e.g., one or more lexical databases, such as WORD-NET®, for word/sense pairs that are synonyms or close relations of the correct word/sense pair, and may exclude results of the query indicated to have a very close meaning to that of the correct word/sense pair from the set of wrong answer choices for the fill-in the blank questions.

For example, the lexical database(s) may indicate the degree by which word/sense pairs are related. For example, the lexical database(s) may indicate whether a word/sense pair is a synonym of, similar to, related enough as a "see also" reference of, or belongs to a domain of another word/sense pair or is the domain to which the other word/sense pair belongs. Moreover, the lexical database(s) may use a series of pointers from word/sense pair branching out a number of levels from word/sense pair to word/sense pair. In an example embodiment for a fill-in the blank question, for each level traversed from the correct word/sense pair to other word/sense pairs via the pointers of the lexical database(s), the system and method may assign a cost to the move, where the cost depends on the defined relationship of the pointer. For example, a synonym may have a cost of zero or nearly zero, while a "see also" relationship may have a cost of 3. Beginning at the correct word/sense pair, the system and method may traverse the pointers along various branches from level to level until, for a respective branch, a threshold cost is reached, at which point the system and method may cease further traversal along that branch. All traversed word/sense pairs may be eliminated from being a possible wrong answer choice.

In an example embodiment, with respect to similarity of use, the system and method may apply different conditions for inclusion of a word/sense pair as one of the wrong answer choices, depending on the POS of the word/sense pair.

For example, if the correct word is tagged as a noun, the system and method may analyze metadata associated with the correct word to determine whether it is countable, such as "people," "chairs," and "files," or uncountable, such as "esteem" and "water," and may require all wrong answer choices to have the same countability characteristic as that of the correct word/sense pair. The metadata indicating the countability of the word may be manually entered into the system (or obtained from an external database). The system and method may further require that all wrong answer choices share the same set of unique beginners as that of the correct word, which is a noun. For example, WORDNET® classifies every noun as having a set of one or more unique beginners, i.e., as belonging to a set of one or more ontological categories, a non-exhaustive list of which includes {act, activity}, {artifact}, {attribute}, {cognition, knowledge}, {communication}, {event, happening}, {feeling, emotion}, {group, grouping}, {location}, {natural object}, {person, human being}, {process}, {relation}, {state}, and {substance}, where each of the sets of the listed sets of brackets is a different ontological category. The system and method may query the lexical database(s) for, and compare, the set of unique beginners for the correct word and the sets of unique beginners for other nouns of the database(s).

For example, if the correct word is tagged as a verb, the system and method may require that all wrong answer choices share the same set of verb frames as that of the correct word. For example, WORDNET® associates each word with a set of one or more verb frames. A verb frame is a phrase structure to which a verb can be applied. For example, a verb frame may be "an object does something to a person." The word "kill" is one of a plurality of verbs that can be applied to such a structure because, for example, a bullet kills a person. Thus, for example, a verb frame may represent whether a verb is transitive or intransitive or whether the verb applies to people and/or things. The system and method may query the lexical database(s) for, and compare, the set of verb frames for the correct word/sense pair and the sets of verb frames for other verbs of the database(s).

For example, if the correct word is tagged as an adjective, the system and method may require that wrong answer choices share the attributional property as that of the correct word. For example, if the correct word is a predicative adjective, the system and method may require that the wrong answer choices be predicative adjectives as well, and, if the correct word is an attributive adjective, the system and method may require that the wrong answer be an attributive adjective as well. The system and method may query the lexical database(s) for, and compare, the attributional properties of the correct word and of other adjectives of the database(s).

Other rules may be applied for other parts of speech. Alternatively, the system and method may output sentences for only word/sense pairs the system may group as belonging to or being similar to one of the above enumerated parts of speech. For example, some adverbs may be treated as adjectives.

In an example embodiment, with respect to similarity of use, for a correct word that has been modified from a version in the electronic dictionary by inclusion of a suffix (and/or prefix), the system and method may additionally require all wrong answer choices to be able to accept a similar suffix (and/or prefix). For example, if the correct word has been pluralized, the system and method requires all wrong answer choices to be capable of being pluralized, but not necessarily in the same way. For example, "wolf" is pluralized by substituting "ves" for "f," while desk is pluralized merely by adding an "s," but the words may be considered to be have sufficient similarity of use in that they are both capable of being pluralized.

In an example, for a fill-in sentence question, for each potential wrong answer choice (e.g., words other than the correct word which have not already been weeded out based on other tested conditions), the system and method searches the indices database for all sentences associated with the potential wrong answer choice for a sentence in which the potential wrong answer choice includes a similar suffix (and/or) prefix as that of the correct word. If the search returns no results, the system and method considers the word as not being able to accept a similar suffix (and/or) prefix as that of the correct word, and removes it from the corpus of possible wrong answer choices for the fill-in the blank questions.

In an example embodiment of the present invention, the system and method may provide a designated word in step 230 and, in a synonym question mode, may output a set of multiple choice answers from which the user may select one as a synonym. The system and method may include only one possible synonym, as one of the choices, and may automatically select a predetermined number of wrong answers for inclusion as the other choices, where the predetermined number of wrong answers may include, for example, a number of antonyms.

In an example embodiment, the system and method may use the lexical database(s) in step 260 to query a corpus of words to determine word/sense pairs that are synonyms or close relations of the designated word/sense pair. In the example embodiment, only a single word/sense pair indicated by the database(s) as a direct synonym may be provided as one of the multiple choices in step 261. A determination of a synonym may depend on such factors as the POS of the designated word, similarity of meaning to the designated word, similarity of use to the designated word, similarity of frequency of use to the designated word, and/or skill level.

For example, the system and method may analyze the corpus of words with respect to a combination of the above-enumerated factors. For example, a designated word may be the word "content." In this example, "content" may refer to a feeling of satisfaction or happiness and the POS of "content" may be an adjective. An appropriate determination by the lexical database(s) may be that the word "satisfied" is a direct synonym of the word. In this context, the word "information" may not be a synonym to "content." The word "satisfied" may have a use with similar characteristics as those of "content," a closest frequency of use, and a predetermined threshold skill level.

The system and method may exclude all of the remaining results of the query indicated to be a synonym or having a very close meaning to that of the designated word/sense pair from the set of wrong answer choices in step 262, i.e., to remove the possibility of multiple correct answers. Word/sense pairs that may not be a synonym but may be cataloged as similar to or "see also" may also be removed from possible wrong answers. Additionally, word/sense pairs that may otherwise be considered a synonym using a different POS or different meaning may also be removed from possible answers. For example, where "satisfied" is provided as a possible answer choice to "content," the word "information" may be removed from being a candidate for being provided as a possible choice.

In an example embodiment, the lexical database(s) may use a series of pointers from the designated word branching out a number of levels from word/sense pair to word/sense pair. The series of pointers may connect the designated word with direct synonyms. The system and method may select one of the word/sense pairs pointed to from the designated word as a synonym. For pointers to other word/sense pairs that are direct synonyms, or synonyms if an alternative definition or POS of the word/sense pair was used, the system may traverse such pointers in step 262 and omit them from the multiple choice answers. For example, where the word/sense pair may be "content" and "satisfied" is determined by the lexical database(s) to be a direct synonym, pointers to word/sense pairs corresponding to "substance" or "matter" may be traversed and omitted.

In an example embodiment, with respect to similarity of use, the system and method may apply different conditions for inclusion of a word/sense pair as one of the wrong answer choices for a synonym question.

For example, if the designated word for the synonym question is tagged as a noun, the system and method may further require that both the direct synonym and all wrong answer choices share the same set of unique beginners as that of the designate word, which is a noun. If the designated word is tagged as a verb, the system and method may require that both the direct synonym and all wrong answer choices share the same set of verb frames as that of the designated word. If the designated word is tagged as an adjective, the system and method may require that both the direct synonym and wrong answer choices share the attributional property as that of the designated word.

In an example embodiment, where a direct synonym is presented as a possible answer choice, the system and method may be configured to ensure that another synonym for an alternative definition is not also provided as an answer choice. In an example embodiment where a designated word may have multiple definitions (such as the "content" example above), the system and method may be configured to ensure that an item that corresponds to a synonym of a separate definition or separate POS is not provided as a wrong answer choice.

In an example embodiment, where a synonym question is asked, the system and method may determine direct antonyms to the designated word and provide these antonyms as wrong answer choices in step 263. The system and method may use a lexical database(s) to query a corpus of words to determine word/sense pairs that are antonyms of the designated word, and may provide one or more of these antonyms as wrong answer choices. In an alternative example embodiment, words may be selected which are neither synonyms nor antonyms of the subject word. In an example embodiment, both antonyms and words that are neither synonyms nor antonyms may be selected as the wrong answers. If a user does not answer the question correctly in step 264, the user may encounter the question again in step 265.

In an example embodiment of the present invention, in an antonym question mode, the system and method may provide a designated word in step 230 and may output a set of multiple choice answers from which the user may select one as an antonym. The system and method may include only one possible antonym, as one of the choices, and may automatically select a predetermined number of wrong answers for inclusion as the other choices, where the predetermined number of wrong answers may include a number of synonyms. Alternatively, words that are neither synonyms nor antonyms may be selected as the wrong answers. In an example embodiment, both synonyms and words that are neither synonyms nor antonyms may be selected as the wrongs wrong answers.

In an example embodiment, the system and method may use the lexical database(s) in step 250 to query a corpus of words to determine word/sense pairs that are antonyms of the designated word or are antonyms of word/sense pairs that have close relations of the designated word. In the example embodiment, only a single word/sense pair indicated by the database(s) as an antonym may be provided as one of the multiple choices in step 251. A determination of an antonym may depend on such factors as the POS of the original word, a definition that may be opposite that of the meaning to the designated word, similarity of frequency of use to the designated word, and/or skill level.

For example, the system and method may analyze the corpus of words with respect to a combination of the above-enumerated factors. For example, a designated word may be the word "down." In this example, "down" may refer to a feeling of unrest or depression. An appropriate determination by the lexical database(s) may be that the word "cheerful" is an antonym of the word. In this context, the word "up" describing a direction may not be an antonym to "down." The word "cheerful" may have a use with similar characteristics as those of "down," a closest frequency of use, and a predetermined threshold skill level.

The system and method may exclude all of the remaining results of the query indicated to be an antonym of the designated word or being an antonym of a word having a very close meaning to that of the designated word/sense pair from the set of wrong answer choices, i.e., to remove the possibility of multiple correct answers in step 252. Additionally, word/sense pairs that may otherwise be considered an antonym using a different POS or different meaning may also be removed from possible answers. For example, where "cheerful" is provided as a possible answer choice to "down," the word "up" may not be provided as a possible choice. In an example embodiment, word/sense pairs that may not be an antonym but may be cataloged as dissimilar to the subject word may also be removed from possible wrong answers in step 252. Alternatively, dissimilar words that are not antonyms may be included as wrong answer choices.

The system and method may also remove antonyms that may contain the root of the designated word. Examples of this may include words that mirror the designated word, but may have a prefix attached. For example, if the designated word is "satisfied," the word "dissatisfied" may not be provided as a possible antonym answer choice because it contains the same root as "satisfied" and would be an obvious answer choice.

In an embodiment, the lexical database(s) may use a series of pointers from the designated word branching out a number of levels from word/sense pair to word/sense pair. The series of pointers may connect the designated word with direct antonyms. The system and method may select one of the word/sense pairs pointed to from the designated word as an antonym. Pointers to other word/sense pairs that may be direct antonyms, or antonyms if an alternative definition or POS of the word/sense pair is used, may be traversed for omission from appearing as answer choices. For example, where the word/sense pair may be "down" and "cheerful" is determined by the lexical database(s) to be an antonym, pointers to word/sense pairs corresponding to "up" or "above" may be traversed for removal of candidates for answer choices.

In an example embodiment, with respect to similarity of use, the system and method may apply different conditions for inclusion of a word/sense pair as one of the wrong answer choices for an antonym question.

For example, if the designated word is tagged as a noun, the system and method may further require that both the direct antonym and all wrong answer choices share the same set of unique beginners as that of the designated word, which is a noun. If the designated word is tagged as a verb, the system and method may require that that both the direct antonym and all wrong answer choices share the same set of verb frames as that of the designated word. If the designated word is tagged as an adjective, the system and method may require that that both the direct antonym and wrong answer choices share the attributional property as that of the designated word.

In an example embodiment, where an antonym is presented as a possible answer choice, an antonym to an alternative definition may not also be provided as an answer choice. In an example embodiment, where a designated word may have multiple definitions (such as the "down" example above), a choice that may correspond to an antonym of a separate definition or separate POS may not be provided as a wrong answer choice.

In an example embodiment where an antonym question is asked, the system and method may determine synonyms to the designated word and provide these synonyms as wrong answer choices in step 253. The system and method may use a lexical database(s) to query a corpus of words to determine word/sense pairs that are synonyms of the designated word, and may provide one or more of these synonyms as wrong answer choices in step 253. If a user does not answer the question correctly in step 254, the user may encounter the question again in step 255.

In an example embodiment of the present invention, in a definition question mode, the system and method may highlight a designated word in step 230 and may output a set of multiple choice answers from which the user may select a definition of the designated word. The system and method may include only one possible definition, as one of the choices, and may automatically select a predetermined number of wrong answers for inclusion as the other choices, where the predetermined number of wrong answers may include definitions of dissimilar words or antonyms.

In step 270, the system and method may use the electronic dictionary to determine a correct definition of a designated word. A definition as provided by the dictionary may depend on the POS of the designated word.

The system and method may use a lexical database(s) in step 271 to query a corpus of words to determine meanings that may be closely related to the correct definition. The lexical database(s) may also determine the definition of word/sense pairs that are synonyms or close relations of the designated word. In the example embodiment, only the definition given by the electronic dictionary may be provided as one of the multiple choices in step 272. Definitions of synonyms or meanings that may closely match the correct definition may be discarded as answer choices.

The system and method may exclude all of the remaining results of the query indicated to be a synonym of the designated word or having a very close meaning to the correct definition in step 273. Definitions of word/sense pairs that may not be a synonym but provide a definition that may be similar to the correct definition may also be removed from possible wrong answers. Additionally, definitions of word/sense pairs for the designated word using a different POS or different meaning may also be removed from possible answers. For example, where "a feeling of satisfaction" is determined by the dictionary as the definition of "content," and therefore provided as a possible answer choice, the definition "of or relating to the substance of a matter" may not be provided as a possible choice, even though this may be a definition of "content."

In an example embodiment, the lexical database(s) may use a series of pointers from the designated word branching out a number of levels from word/sense pair to word/sense pair. The series of pointers may connect the designated word with various definitions that may be similar to the definition of the designated word. The system and method may select one of the word/sense pairs pointed to from the designated word as a correct definition. Pointers to other similar definitions, or definitions of synonyms of the designated word if an alternative definition or POS of the word/sense pair is used, may be traversed and removed from the answer choices. For example, where the word/sense pair may be "content" and "a feeling of satisfaction" is determined by the dictionary to be the correct definition, pointers to definitions related to other meanings of "content," i.e., "of or relating to the substance of a matter," may be traversed.

In an example embodiment, the system and method may apply different conditions for inclusion of a definition as one of the wrong answer choices in step 274. For example, if the designated word is tagged as a noun, the system and method may further require that all wrong answer choices contain definitions of word/sense pairs that correspond to a noun. If the designated word is tagged as a verb, the system and method may require that all wrong answer choices contain definitions of word/sense pairs that correspond to a noun. If the designated word is tagged as an adjective, the system and method may require that wrong answer choices contain definitions of word/sense pairs that correspond to a noun.

In an example embodiment, where the correct definition is presented as a possible answer choice, a similar definition may not also be provided as an answer choice in step 274. In an example embodiment, where a designated word may have multiple definitions (such as the "content" example above), a choice that may correspond to a definition similar to that of a different meaning of the designated word may not be provided as a wrong answer choice.

In an example embodiment, where a definition question is asked, the system and method may use a lexical database(s) to determine definitions of antonyms to the designated word and provide these definitions as wrong answer choices. The system and method may use any definitions for wrong answer choices, except for the definitions which have been previously discarded. If a user does not answer the question correctly in step 275, the user may encounter the question again in step 276.

The system and method may also generate hint questions for the user to answer. A hint question may ask a user a question about a designated word, i.e., to select a synonym, but, in addition to being provided with a list of answer choices, a user may also be provided with a sentence that uses the designated word, which may serve as a "hint" to the user. A user may then use the provided sentence to assist in the user's determination of the synonym of the designated word.

The system and method may provide two types of hint questions: synonym hint questions and definition hint questions. In an example embodiment of the present invention, the system and method may ask a user to determine a synonym of a designated word and may provide an example sentence containing the designated word from the index of sentences, as a hint, to illustrate the use of the designated word. In another example embodiment, the system and method may ask a user to determine a definition of a designated word and may provide a supplemental sentence containing the designated word from the index of sentences as a hint. The system may provide example sentences for both synonym hint and definition hint questions which contain the designated word where it is used in a way consistent with the target word/sense pair, but the definition is not readily apparent.

In an example embodiment, the system and method may provide the user with a synonym hint question by highlighting a designated word within a provided sentence and outputting a set of multiple choice answers from which the user may select one as a synonym. The system and method may include only one possible synonym, as one of the choices, and may automatically select a predetermined number of wrong answers for inclusion as the other choices, where the predetermined number of wrong answers may include, for example, a number of antonyms. The user may use the provided sentence to assist in a determination of a synonym.

The right and wrong answer choices for a synonym hint question may be generated using the same method for generating right and wrong answer choices for synonym questions, i.e. querying a lexical database to determine synonyms, selecting a synonym, and removing other synonyms from being wrong answer choices.

In an example embodiment of the present invention, the system and method may provide the user with a definition hint question by highlighting a designated word within a provided sentence and outputting a set of multiple choice answers from which the user may select a definition of the designated word, in the context of the sentence. The system and method may include only one possible definition, as one of the answer choices, and may automatically select a predetermined number of wrong answers for inclusion as the other answer choices, where the predetermined number of wrong answers may include definitions of dissimilar words or antonyms. The user may use the provided sentence to assist in a determination of a definition.

The right and wrong answer choices for a definition hint question may be generated using the same method for generating right and wrong answer choices for definition questions, i.e., querying a lexical database to determine actual definitions of the generated words, selecting a correct definition, removing other similar definitions from being wrong answer choices, and providing definitions of other words as possible wrong answer choices.

In an example embodiment, with respect to skill level, the system and method may limit the wrong answer choices to those that have been indicated to be likely to appear in a standardized test, such as the SAT or GRE.

For all question types, the system and method may analyze a large corpus of text (e.g., including more than one billion words) to determine a respective frequency of each word of the electronic dictionary, and sort the words by their respective frequencies. Of all of the possible wrong answer choices that satisfy all of the other applied conditions, the system and method may select those whose respective frequency values are of the (e.g., three in an instance where three wrong answer choices are provided) shortest absolute distances to the frequency value of the correct word. For example, if the correct word appears 345 times, the selected wrong answer choices might have respective frequency values of 340, 347, and 348, frequency values of all other possible words being either less than 340 or greater than 350, which are of greater absolute distance to the frequency value of the correct answer than the greatest absolute distance of 5 of the frequency values of the selected wrong answer choices from the frequency value of the correct answer.

In an example embodiment, presented sentences (for fill-in sentences, synonym hint sentences, and definition hint sentences) or designated words may be ranked by difficulty and by ability to discriminate between different skill levels of test takers, and may be selected based on those rankings. In an example embodiment of the present invention, a sentence's difficulty and discrimination scores may be calculated in two stages, where, in the first stage, the scores are calculated prior to being output as a test question, and, in the second stage, the scores are recalculated each time an answer selection is made.

In the first stage, a sentence's difficulty score may be based solely on the frequency value (described above) of the correct answer, where the greater frequency values represent lesser sentence or designated word difficulty. The sentence frequency values may be further grouped into difficulty categories, e.g., ranging from −10 (easiest) to 10 (hardest). Students' abilities may be similarly grouped into ability categories, e.g., ranging from −10 (least ability) to 10 (greatest ability). For a particular test taker, sentences are selected from those having the closest difficulty category matching the ability category of the test taker, e.g., a sentence or designated word having a difficulty of −6 for a test taker having an ability of −6 (or −7 where there are no sentences having a difficulty of −6, e.g., to which the test taker has not already responded or, alternatively, that have not already been output to the test taker). In an example embodiment, the system and method may exclude questions that have already been answered by the test taker or, alternatively, that have already been output to the test taker.

Prior to answering any questions, the system and method may initially assign the test taker to a predetermined ability category. Subsequently, as the test taker answers questions of varying difficulty, the system and method may, e.g., continuously, reassign the test taker to different ability categories. For example, the system and method may assign the test taker to the ability category corresponding to a difficulty category of whose questions the test taker answers 50% correctly. In an example embodiment, the ranking of the test taker may be based on a combination of the test taker's performance during a present test session and prior test sessions. Accordingly, the system may maintain a record of a test taker's performance from session to session.

Moreover, of those sentences having a matching difficulty rank, those sentences which have the highest discrimination scores are selected for output. Discrimination scores may range, e.g., from 0 to 2. In an example embodiment, all sentences for which answers have not yet been input may be initially set to the same predetermined discrimination score, e.g., a low score, which may be changed in the second stage as described below.

In the second stage, the system and method may determine a new difficulty category and a new discrimination category for a question after, and based on, each response to the question. For example, the system and method may divide all the test takers who have answered the question into a series of ability groups corresponding to the ability categories by which each of the respondents have been ranked, e.g., ranging from −10 to 10, and calculate, for each group, the percentage of respondents of the group who correctly answered the question. The system and method may then plot the ability groups against the respective percentages calculated for those ability groups, and determine the new difficulty and discrimination categories to which the question is assigned based on the plotted data.

Figure 4:
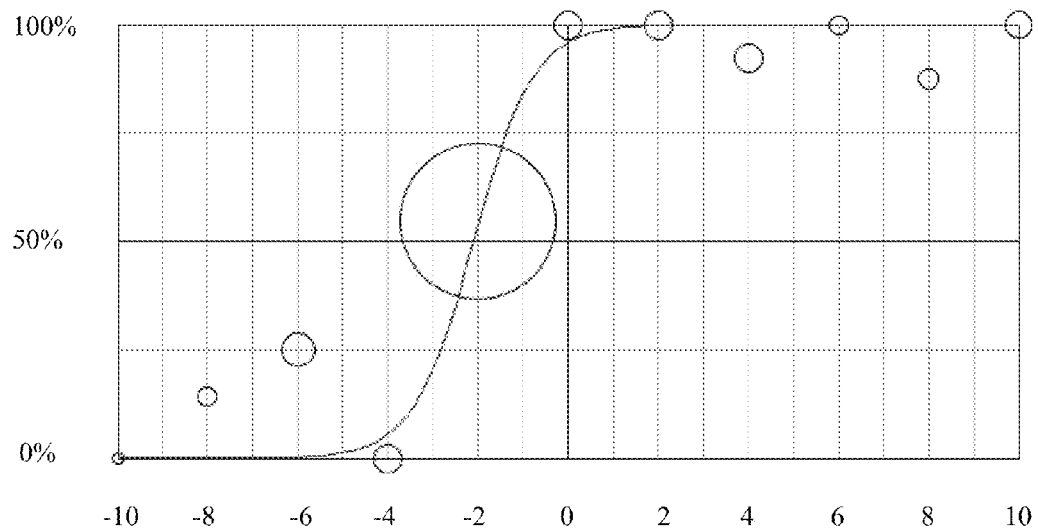
FIG. 4 is a graph plotting ability categories against a percentage of respondents of groups who have correctly responded to a fill-in sentence type question, according to an example embodiment of the present invention.

For example, Table 1 below represents an instance where 199 users have answered a particular question, and indicates, for each represented ability group, the number of users of the group who have answered the question, the number of those who have answered the question correctly, and the calculated percentage. FIG. 4 shows a graph, corresponding to Table 1, in which the scale of ability groups ranging from −10 to 10 is represented by the abscissa, and the scale of calculated percentages ranging from 0% to 100% is represented by the ordinate.

TABLE 1

| Ability Groups | | | |
| --- | --- | --- | --- |
| ability group | users | correct | % |
| 10.0 | 12 | 12 | 100 |
| 8.0 | 8 | 7 | 87.5 |
| 6.0 | 7 | 7 | 100 |
| 4.0 | 13 | 12 | 92.31 |
| 2.0 | 13 | 13 | 100 |
| 0.0 | 13 | 13 | 100 |
| −2.0 | 95 | 52 | 54.74 |
| −4.0 | 13 | 0 | 0 |
| −6.0 | 16 | 4 | 25 |
| −8.0 | 7 | 1 | 14.29 |
| −10.0 | 2 | 0 | 0 |
| Total: | 199 | 121 | 60.8 |

For determining the categories based on the plotted values, the system and method applies a curve fitting algorithm to determine a best fit curve for the plotted values, for example, as shown in FIG. 4. The plotted points may be weighted differently depending on the number of respondents of the plotted ability group. For example, while the circles in FIG. 4 might not be drawn to scale, their different sizes are intended to correspond to the respective numbers of respondents of the respective represented ability groups. For example, the largest number of respondents were of ability group −2.0, around which point the largest circle is drawn. The greatest weight may be given to the point plotted for group −2.0 because the greatest number of respondents are of that group.

The system and method then assigns the ability category closest to the plotted point at which the calculated curve crosses the x-axis (corresponding to 50% on the ordinate scale) as the difficulty category of the question. The system and method also then assigns the slope of the calculated curve at the plotted point at which the calculated curve crosses the x-axis as the discrimination score of the question.

In an alternative example embodiment of the present invention, the ability category closest to the plotted point at which the calculated curve crosses the x-axis is used as one of the input parameters to an equation for calculating the difficulty category. For example, the difficulty category may continue to be based partially on the frequency value (described above) of the correct answer of the question. In a variant of this alternative, each time the question is answered and the difficulty category recalculated, the frequency value may be weighted less in the calculation of the difficulty category, e.g., until its weight is zero.

In an example embodiment of the present invention, in an instance where a test taker's ability category changes during a test taking session, the system and method recalculates the difficulty and discrimination categories for any question that was previously answered by the test taker during the same test taking session and prior to the re-ranking of the test taker's ability, and for which the difficulty and discrimination categories were previously calculated during the same test taking session, after the test taker answered the question, and prior to the re-ranking of the test taker's ability.

With the re-categorization of the question, the test taker's ranking might not be accurately reflected. Accordingly, in an example embodiment of the present invention, after re-categorization of the question, the system and method may re-perform the calculation for ranking the test taker. If the test taker is thereby re-ranked, the system and method may cycle back to re-categorize the questions. The system and method may continue to cycle in this way until the categorization of the questions and the ranking of the test taker stabilize.

In an example embodiment of the present invention, the system and method conditions an initial categorization of questions based on a test taker's performance during a particular session on the test taker having answered a predetermined number of questions during the particular session, thereby increasing the probability that the initial categorization of the questions is based on an accurate ranking of the test taker's ability during the particular session.

In an example embodiment, the system and method may refrain from re-calculating the difficulty and discrimination categories of those questions whose categories were calculated based on questions answered by the re-ranked test taker in a prior session of the test taker and not the current session of the test taker, because it may be assumed that the re-ranking of the test taker across multiple sessions represents an actual change in the test taker's ability over time, whereas a re-ranking within a single session may be considered to reflect a change in data during the session regarding the test taker's ability which ability remains stable throughout the single session.

Figure 5:
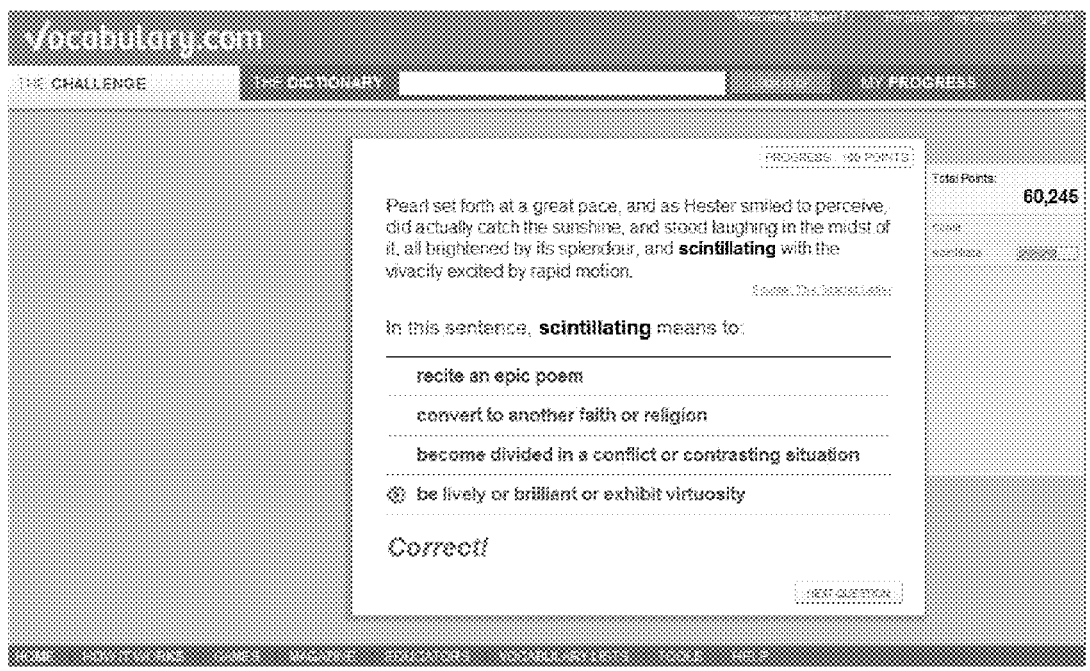
FIG. 5 is a screen shot of an interface of an adaptive learning system, according to an example embodiment of the present invention.

The system and method of the present invention may allow for an adaptive learning system which may tailor questions and explanations of the correct answer to the presented questions to the test taker, in a manner that may allow for the test taker to improve the test taker's vocabulary acquisition and retention. FIG. 5 is a screen shot of an example interface of the adaptive learning system 20. A test taker may be asked one question at a time which question may be displayed on the interface as depicted in FIG. 5. A test taker may be asked a number of questions in a series of rounds, to allow for an optimization of learning for the test taker. The number of questions per round may be selectively chosen, and in an example embodiment, may consist of 10 questions per round. The questions presented to a test taker may be separated into four categories of question: assessment, review, progress, and mastery review.

An assessment question is a question that is directed towards brand new material that the user has not previously encountered, allowing the system to determine a user's ability. An assessment question may, for example, involve a new designated word that has not been previously presented to the user. The system may store and update for a user a respective Active Learning List which may catalog all of the words that the user has encountered and is working towards learning. The system may be configured to provide assessment questions such that words already on a user's Active Learning List are not included in assessment questions output to the user. Once a user answers an assessment question, the designated word in the assessment question may be added to the Active Learning List. The Active Learning List may indicate whether the user correctly answered a question about the designated word, and is making progress on learning the word, or incorrectly answered the question about the designated word.

A review question is an exact question, verbatim, that the user previously answered incorrectly in a previous round. When a question is incorrectly answered by a user, it is placed on the user's Active Learning List, and the list may indicate that the user has incorrectly answered a question concerning the word. The system may be configured to provide review questions such that only words that are on a user's Active Learning List, that were answered incorrectly, are tested by the review questions. The system may be configured such that a review question is repeated after (at least) a predefined number of questions are output after the question, testing the same word tested by the review question, was incorrectly answered by a user.

A progress question is a question that is presented as a follow-up question concerning a designated word that was the subject of a previously output question a user correctly answered. By testing a user again about a designated word, these progress questions may demonstrate a user's comprehension of the word. Since progress questions are only asked about words the user has already encountered, according to an example embodiment, progress questions only test words from a user's Active Learning List, for example after a review question testing the word has been correctly answered or after the user correctly answers an assessment question or another progress question about the designated word. If subsequent progress questions are answered correctly about a designated word, a word may be marked as "mastered" in the Active Learning List.

A mastery review question is a question about a "mastered" word in the Active Learning List. Mastery review questions appear less frequently than progress or review questions and are designed to ensure that a user still remembers that definition, synonym, or antonym of a designated word.

Questions that are categorized as assessment questions, may be presented to the user based on the user's ability (described above). In an example embodiment, a user who correctly answers an assessment question about a designated word, may subsequently receive a progress question in a later round, about the designated word. The system and method may note that the assessment question was answered correctly and may discard the question from being asked in a subsequent round. If the user does not answer an assessment question correctly, the system and method may note that the question was answered incorrectly, and may output the question in a subsequent round as a review question. If a question is answered incorrectly, the designated word may be added to a generated list of words that the user may be learning (Active Learning List).

In an example embodiment, where a user incorrectly answers any type of question in steps 223, 254, 264, and 274, the system and method may re-present the same question as a review question in a subsequent round. If a user correctly answers a review question, the system and method may note that the review question was answered correctly and may discard the question from being asked again. If the user does not correctly answer a review question, the system and method may make a notation that the question was answered incorrectly, and may output the question again in a subsequent round.

In an example embodiment, like review questions, progress questions may also test words from the Active Learning List, but do not include questions that were already presented to the user. A progress question may be a follow up question about a designated word for which the user correctly answered a question. A progress question may test on the same designated word, but may test a different meaning of the word, or may present a new question and/or question type testing the same meaning.

In an example embodiment of the present invention, a progress question may be provided for a designated word after a user correctly answers a previous assessment, review, or even a previously provided progress question concerning a word on the Active Learning List. A progress question may be a follow-up question about the designated word which may test a user on additional definitions or uses. If a user correctly answers a progress question, the system and method may mark any progression on the word in the Active Learning List in step 225, including the number of questions that the user has answered correctly about the designated word. For example, the system may indicate the number of questions concerning the word the user, e.g. consecutively, correctly answered. The system and method may output additional progress questions testing the same designated word. If a user incorrectly answers a subsequent progress question, the user may be presented with the incorrectly answered question as a review question in a subsequent round in steps 224, 255, 265, or 276.

In an example embodiment, where an individual correctly answers a predetermined number of progress questions about a designated word in a row, the word may be classified as mastered in step 280. In step 290 the designated word may be marked as mastered on the Active Learning List. The number of questions that a user must answer correctly to achieve mastery on a designated word may be based on the number of questions in the index for that word. A user that has mastered a designated word in step 280, may encounter questions concerning the mastered word at a reduced frequency in subsequent rounds.

In an example embodiment of the present invention, a particular definition for a designated word may be emphasized for the user for comprehension. This may occur, for example, in an instance where the user is presented with a sentence using the designated word in a context consistent with the particular definition, or the presented synonyms or antonyms relate to the particular definition of the designated word. In this embodiment, an administrator, i.e., a teacher or someone in an education setting, may manually tag words in a corpus of sentences to indicate whether its definition as used in a respective sentence is a key definition. Alternatively, the words of the corpus of sentences may be tagged with their definitions in the given context, and the system may treat the definition that most often is tagged for the given word as the key definition. Progress questions presented to the user may be concentrated on testing the user on the particular definition for the designated word.

Questions that may be categorized as mastery review questions, may test words already designated as a mastered word in the Active Learning List. Unlike regular review questions, mastery review questions present questions to a user that the user has not seen. These mastery review questions may be intended to reinforce that a user understands the definition and use of a particular word. If a user correctly answers a mastery review question, the presented mastery review question may be discarded and the user may receive a subsequent mastery review question in a later round. If a user incorrectly answers a mastery review question, the designated word may be removed from the list of mastered words. That is, the designated word may no longer be marked on the Active Learning List as mastered, and the user is no longer considered to have mastered the word. If a mastery review question is incorrectly answered, the missed question may be presented again to the user, in identical form, as a review question in a subsequent round. The user may again master the designated word by correctly answering the review question (which is simply the missed mastery review question), and again answering a series of progress questions about the designated word. If a user incorrectly answers a mastery review question about a designated word, the system may be configured such that it does not again indicate the user to have mastered the word in the same session. Re-mastery of the designated word may be made in subsequent sessions. For example, the system may require the user to log-out and re-log-in in before updating the user history to indicate that the user has mastered the word.

The system and method of the present invention may operate in two distinct modes when a user is not logged in: an experimental mode which may tailor the adaptive learning system to output questions that may benefit all users in the system, and a non-experimental mode in which the questions and explanations of the correct answer are tailored to benefit an individual user. For example, the system may operate according to the experimental mode when a user makes use of the system as a guest, without payment of a fee, and according to the non-experimental mode when a fee is paid.

In an example embodiment of the present invention, the system may operate in an experimental mode. In this mode, the system may output questions tailored for compiling information about the output questions, based on responses to the output questions, to determine their suitability (as described above) to all users of the system. A number of questions for designated words may have been output to users with less frequency than other questions, thus limiting information to the system about the suitability of these output questions. The system may therefore output such questions more frequently for users in the experimental mode to determine their suitability for general usage.

During experimental mode, a user may operate as an anonymous user, where the user's progress is not tracked by the system from session to session. As the user is not logged in, the user does not have access to the user's Active Learning List. Therefore, the system may be configured such that the questions presented to the user are not based on the user's Active Learning List. During experimental mode, a user may be presented with infrequently output questions about a designated word in an effort to allow the system to obtain valuable information about the nature and suitability of the presented question. These questions may be organized according to their playcount, namely how often the question has been output to users. An experimental question with the lowest playcount may be selectively presented to the anonymous user, for example, conditional upon that the question's difficulty is within the range of +1 to −1 from a determined user ability of the anonymous user. As discussed above, where a user's ability has not yet been fully determined, an initial ability categorization may be made. For example, when an anonymous user begins a session, the system may initially assign the anonymous user to a predetermined ability category, and may output a plurality of questions having varying difficulty to determine the user's ability category.

In an example embodiment of the present invention, the system may present an experimental question with the lowest playcount to an anonymous user conditional upon that the anonymous user has not been tested by another question about the designated word in the experimental question, e.g., in the same session. An experimental question may also be presented to the user conditional upon that the question has not been presented to the user within the last 14 days, e.g., where the user is not anonymous but has not logged in with certain privileges allowing the user to use the system in a non-experimental mode.

In an example embodiment of the present invention, the system may be operating in a non-experimental mode. As with the experimental mode, the system may operate in the non-experimental mode when a user is not logged in. In the non-experimental mode, the response to the output questions may generate subsequent questions that are most suitable for the individual anonymous user. Therefore, the non-experimental mode differs from the experimental mode in that the non-experimental mode models suitability for an individual user rather than all of the system users, even though a user is not logged in. The presented questions may be tailored to the anonymous user, where the anonymous user may be presented with suitable questions in accordance with the discrimination level of the question, and the questions may be organized according to their discrimination level. A question with the highest discrimination may be selectively presented to the anonymous user if the question's difficulty is within the range of +1 to −1 from a determined user ability for the anonymous user. As discussed above, where an anonymous user's ability may not been fully determined, an initial ability categorization may be made.

In an example embodiment of the present invention, the system may present a suitable question with the highest discrimination to an anonymous user conditional upon that the anonymous user has not been tested by another question about the designated word in the presented question, in the same session. A question may also be presented to the user conditional upon that the question has not been presented to the user within the last 14 days.

In an example embodiment of the present invention, the system may operate when a user is logged into the user's account (e.g., as a member). When a user is logged in, the system may operate in yet another mode, the logged-in mode, different than the experimental and non-experimental modes. The system may allow the logged in user to have access to the user's Active Learning List and may cause the system to generate questions based on the Active Learning List that are most suitable to the user, which further allows the adaptive learning system to be tailored to the user.

Questions may be presented to the logged in user in rounds of 10 questions, and each question in the round may be presented to the user individually as shown in FIG. 5. Initial questions may be presented to the user based on a determined ability of the user. If a user is presented with a question that tests on a designated word that the user has not encountered, the designated word may also be added to the Active Learning List. This entry to the Active Learning List may denote that the user correctly answered a question about the designated word, and is making progress on the designated word.

As discussed above, a user may be first given an assessment question on a new designated word to test the user's ability. Responsive to a selection of the correct answer, the system may record progress of the designated word in the Active Learning List in step 225. A user may then be presented with a series of subsequent progress questions which may test the user on alternative definitions or uses of the designated word. If a user correctly answers the subsequent progress questions correctly, the word may be considered mastered in step 280, and marked accordingly in the Active Learning List. If a word is deemed mastered by a user, the user may only encounter questions about the designated word during mastery review questions, which may occur much more infrequently.

In an example embodiment, if any of the assessment, progress, or mastery review questions are answered incorrectly, the user may encounter the same question again in a subsequent round, as a review question. No progress may be recorded in the Active Learning List if an incorrect answer was selected and progress may not be made on a designated word if it was incorrectly answered in the same session. If a user answers a review question correctly (in a subsequent session), the user may be presented with subsequent progress questions.

Assessment questions, which may be presented to the user to test new words, may be organized in accordance with their discrimination level and presented to a user based on the discrimination level of the question. In an example embodiment, an assessment question with the highest discrimination may be selectively presented to the user if the assessment question's difficulty is with the range of +0.5 to −0.5 from a determined user ability. As discussed above, where a user's ability may not been fully determined, an initial ability categorization may be made.

In an example embodiment of the present invention, the system may present a suitable assessment question with the highest discrimination to the user conditional upon the same not having been tested by another question on the same designated word. An assessment question also may not contain a designated word on a user's Active Learning List and may not be a designated word that the user is working on.

If an assessment question is answered incorrectly by a user the designated word may be placed in the Active Learning List. The user may be presented with the question as a review question in a subsequent round, such as steps 224, 255, 265, and 276. As previously discussed, progress may not be made on a designated word if the assessment question was answered incorrectly in the same session. If an assessment question is answered correctly, the user may be presented with subsequent progress questions.

Progress questions are on words in a user's Active Learning List and may represent questions that are presented to the user to test alternative definitions or uses of a designated word after the user had correctly answered a question about the designated word in a previous round. Questions that test on a new word that was not previously presented to the user, may not be presented as progress questions.

Progress questions may not be presented on words that were previously answered incorrectly within the same session. A question that has been previously presented to the user may not be used as a progress question (a correctly answered question may be discarded and an incorrectly answered question may be presented as a review question).

In an example embodiment, where the user incorrectly answered a question about the designated word, the user may be presented with the incorrectly answered question as a review question, and must wait until a new session before being presented with a progress question about the designated word if the user answers the review question correctly. Upon correctly answering the review question, in a new session, a question may be presented as a progress question for the designated word where the question tests the same sense as the previously incorrectly answered question, and conditional upon that the progress question is within the range of +3 to −10 from a determined user ability. In an example embodiment, the system may present progress questions in accordance with the discrimination level of the question, with questions with the highest discrimination being asked first.

In an example embodiment of the present invention, where no possible progress questions exist that are within the range of +3 to −10 from a determined user ability, questions outside this range may be presented as progress questions, with questions being prioritized according to proximity to a user's ability. In an example embodiment where no possible questions exist that are consistent with the sense of the designated word, questions concerning the designated word for a different sense that has not been presented to the user may be presented as progress questions, unless these questions have been previously presented to the user.

Review questions may encompass questions that were previously presented to the user as either an assessment question or a progress question that the user answered incorrectly. Review questions may be continually presented to the user in the review mode, in subsequent rounds, until the question is answered correctly. If a review question is answered correctly by a user, the question may be removed from future rounds, and the user may be presented with a progress question about the designated word, in a future session. According to an example embodiment where progress may not be made within the same session on previously incorrectly answered questions of designated words, a progress question may not be asked about a designated word that was in a review question, until another session.

Mastery review questions may represent questions selected for words that have already been mastered by a user. Words may be mastered by a user by correctly answering the assessment and progress questions of a designated word. Words may still be mastered even if a user incorrectly answers a question about the designated word in an earlier session, if the user answers subsequent review and progress questions about the designated word correctly in later sessions. If a user answered every question pertaining to a designated word correctly during the user's progression, the user may not encounter sentences with the designated word in a mastery review mode. Words that may be marked as mastered in the previous week, may not be eligible for mastery review.

Figure 6:
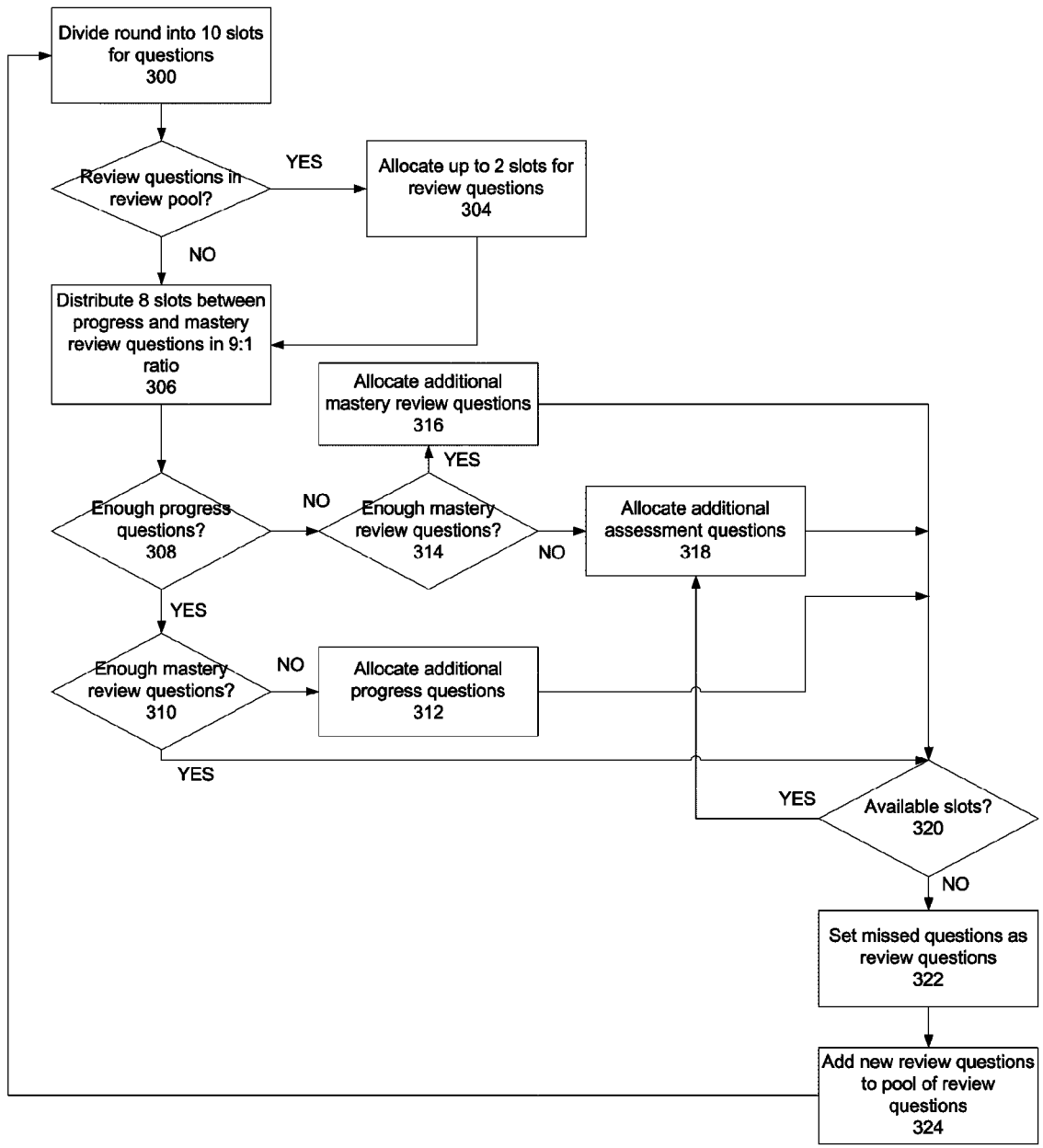
FIG. 6 is a flow diagram of a process of determining an allocation of questions by question category in each of a plurality of rounds, according to an example embodiment of the present invention.

As described above, questions may be presented to the user in rounds of 10 questions. FIG. 6 is a flowchart that illustrates a process of determining the allocation of the questions by question category in each round. An allocation of each of the 10 slots in each of the rounds may be made in step 300 to allow for the user to be presented with a combination of assessment questions, review questions, progress questions, and mastery questions. In an embodiment of the present invention, the ordering of the 10 questions may be arbitrary.

In an example embodiment, the allocation of the 10 slots for questions for both experimental and non-experimental modes may be made according to a predetermined distribution. Of the 10 slots, up to two slots may be allocated for review questions repeating questions that the user incorrectly answered as noted in step 304. If a user previously answered less than two questions incorrectly, any outstanding review question slots may be allocated to assessment questions. For example, if a user had previously incorrectly answered only one question, or only had one incorrect question outstanding from previous rounds that was never presented as a review question, the system and method may be configured to limit to only one of the 10 slots allocation of a review question. The leftover review question slot may be allocated instead to assessment questions.

If a user previously answered more than two questions incorrectly, the system and method may be configured to, nevertheless, allocate only two of the 10 slots to review questions, and the outstanding review questions may be carried over for use in a subsequent round. For example, if a user had previously incorrectly answered four questions in previous rounds, only two slots of the 10 slots may be allocated to representing review questions. The outstanding two incorrectly answered questions may be allocated as review questions in a subsequent round.

After up to two of the 10 slots are allocated to review questions in step 304, the remaining eight slots may be allocated randomly using a probability distribution. In step 306, 90% of the eight slots may be allocated to progress questions (seven slots), and 10% of the remaining slots may be allocated to mastery review questions (one slot).

Assessment questions may be allocated to any remainder slots in steps 318 and 320 after the allocation of the review, progress, and mastery review questions. In an example embodiment of the present invention, where there are no review questions in step 302, i.e., the user has not incorrectly answered a previous question, the user may be presented with seven progress questions and one mastery review question in step 306. The remaining two slots may be allocated to assessment question presenting new words.

In an example embodiment, where the system runs out of mastery questions in step 310, this slot may be filled with a progress question in step 312. The system may allocate the remaining slot to a progress question unless the system has run out of progress questions in step 308, and therefore an assessment question may be allocated in step 318. In an example embodiment, where the system runs out of progress questions, a check for mastery review questions may be made in step 314, and if present, additional master review questions may be added in step 316. If no mastery review questions are left in step 314, an assessment question may be allocated to the remaining progress slots in step 318. Thus, according to one example embodiment, assessment questions are provided only where there are not enough review, progress, and assessment questions. Any incorrectly answered progress, assessment, or mastery review questions may be designated as review questions in step 322 and added to the pool of review questions in step 324.

A user may progress towards mastery of a designated word by correctly completing subsequent progress questions. In an embodiment, mastery of the designated word may occur by answering the progress questions correctly over more than one session. The number of progress questions that must be answered to achieve mastery of a word may vary by the word and the number of sentences in the compiled index containing that designated word. In an example embodiment, a user may need to answer at least three progress questions to achieve mastery of a word. If three progress questions related to the designated word are not available, mastery of the word may be achieved by answering all the available questions. In an embodiment where multiple definitions exist, and there exists questions for the multiple definitions, the system may be configured to output at least one question for each of the definitions as progress questions in subsequent rounds. In this embodiment, no more than five progress questions are needed to achieve mastery of the designated word, even if more than five definitions of the designated word exist.

In an example embodiment of the present invention, after each round of 10 questions, a user may be provided with a round summary providing a synopsis of the user's performance during the round. A user may be notified of words that the user answered correctly as well as words that the user incorrectly answered during the previous round.

In an example embodiment of the present invention, the system and method may be configured to present to the user a game based on the Active Learning List. For example, the system may select words that the user incorrectly answered in previous rounds. Words that may be incorporated into the game may include designated words from review questions that the user may be working on, from the Active Learning List. In an example embodiment, where the system generates words based on the Active Learning List, the system may be configured such that words that the user has mastered or is denoted as progressing on are not used as the basis for the generation of the game.

In an example embodiment, the game may be a synonym maze, where the user may progress through a tile grid with a plurality of synonyms of one of the words of the Active Learning List (and/or including the word of the Active Learning List itself), such that each of the synonymous words is adjacent to at least one other of the synonymous words to form a path beginning at a first grid tile and ending at a second grid tile, e.g., at an opposite edge of the grid tile than the first grid tile. The user may connect from the beginning to the end of the maze by selecting the synonymous words, as described in detail in U.S. patent application Ser. No. 13/075,863, entitled "System and Method for Advancement of Vocabulary Skills in a Game Environment," and the entire content of which is hereby incorporated herein by reference.

In an alternative embodiment, the displayed game may be a matching game containing a plurality of pairs of designated words, where a user may selectively turn over two tiles, in an effort to find a matching pair for a designated word. In an alternative embodiment, the designated words may be incorporated into a spelling bee, whereupon the user may attempt to correctly spell a designated word. Other games incorporating words from the Active Learning List may be used, it being understood that the example games discussed do not represent an exhaustive list.

In an example embodiment of the present invention, the system and method may include a point system that may reward a user for achieving certain milestones or achievements. A user may receive and accumulate points for selecting a correct answer to a question. In an embodiment, the number of points earned may be dependent upon the question category asked. For example, a user may receive more points for correctly answering a progress or mastery question, than for answering an assessment or review question. Points may also be received for different events, such as mastering a word, consecutively answering questions in a row, and/or for performing well in an end of the round summary game, with the amount of points given depending on the event accomplished. A user may also receive special recognition (a badge) for the achievement of certain events such as the mastering of a certain number of words, or the mastering of a particular designated word.

In an example embodiment, the system and method may provide the user with the option of receiving a hint for a question. A user may request a hint in step 226, 256, 266, and 277 (dependent on the question type), whereupon the user is given a choice of hints. Examples of hints may include removing wrong answer choices or seeing the designated word used in a sentence (if the question presented is not a fill-in sentence). A user may select an answer based on the receipt and application of the hint. If a user chooses to receive a hint, the system may record that that the user requested a hint in steps 226, 256, 266, and 277. The user may earn a smaller number of points for selecting the answer with the assistance of a hint. Even if a user selects the correct answer for the assessment question, the user may not be given credit for knowing the answer and the question may be repeated in a subsequent round as a review question, because the user who requested a hint did not know the answer without the hint.

In one example embodiment, the system may be configured such that there is no option of hints for review, progress, or mastery review questions. Progress and mastery review questions may require demonstration that the user fully understands and comprehends the designated word in order for a user to progress towards mastery of the word. Therefore, receiving a hint may indicate a lack of comprehension by the user. Review questions have already been presented to a user, thus negating the need for a user to obtain a hint.

The presence of hints in the system may allow for the user to deduce the answer without resorting to simple guessing. If the user guesses and correctly identifies the correct answer choice, the system may erroneously determine that the user knew the answer to the presented question, when the user did not. This may have the unwanted effect of altering the corresponding determined ability of the user, and the user may receive questions that are outside of the user's ability range, thus negating the purpose of the system to promote word comprehension.

In an example embodiment, the system may be configured such that, for the same word (a) in the event that a user correctly answers a question, the system and method provides the user with only a simple explanation alluding to the definition of the designated word, and (b) in the event that the user incorrectly answers a question, the system outputs a longer explanation. The longer explanation (a "blurb") may explain the nature of the designated word, including, but not restricted to, the complete definition of the word, the etymology of the word, synonyms and antonyms of the word, and the use of the word in an example sentence.

The above description is intended to be illustrative, and not restrictive. Those skilled in the art can appreciate from the foregoing description that the present invention may be implemented in a variety of forms, and that the various embodiments may be implemented alone or in combination. Furthermore, it will be appreciated that method steps are not limited to the example sequence illustrated in the accompanying flowcharts. Therefore, while the embodiments of the present invention have been described in connection with particular examples thereof, the true scope of the embodiments and/or methods of the present invention should not be so limited since other modifications will become apparent to the skilled practitioner upon a study of the drawings and specification.

What is claimed is:

1. A computer-implemented method for generating vocabulary questions, the method comprising:
    obtaining, by a computer processor, a sentence from a database;
    determining, by the computer processor, whether a word of the obtained sentence, the word having multiple definitions, is used in the sentence consistently with one of the multiple definitions which has been selected as a target definition;
    responsive to a result of the determining being that the use of the word in the sentence is consistent with the one of the multiple definitions, providing, by the computer processor, the sentence for use to generate a question concerning the word of the sentence; and
    outputting, by the computer processor, the question.

2. The method of claim 1, further comprising outputting a set of selectable multiple choice answers selectable for responding to the output question.

3. The method of claim 2, wherein the set of multiple choice answers is a set of text strings, each including one or more words, which are alternatively selectable by the user for answering the generated question.

4. The method of claim 3, wherein only one of the set of multiple choice answers corresponds to the correct answer.

5. The method of claim 1, further comprising:
    retrieving text, by the computer processor, from an online content source; and
    analyzing at least one punctuation mark in the retrieved text to determine at least one boundary of the sentence in the retrieved text, the obtaining of the sentence being in accordance with the determined boundary.

6. The method of claim 5, wherein the retrieved text is timestamped, and the method further comprises discarding text retrieved multiple times from a same source within a predetermined period of time of the timestamp.

7. The method of claim 5, further comprising:
    parsing the sentence, by the computer processor, to apply at least one marker for the definition of the word with which the use of the word in the sentence is consistent; and
    storing the sentence in the database, wherein the sentence is retrievable by the at least one definition marker.

8. The method of claim 1, further comprising:
    assigning a priority to the sentence, by the computer processor, based on at least one of frequency of use of words of the sentence and likelihood of appearance of the words of the sentence on a standardized test.

9. The method of claim 8, wherein a plurality of sentences, including the sentence to which the priority was assigned, are reviewed in an order that is based on the assigned priority, during which review the plurality of sentences are assigned to respective ones of a plurality of quality categories.

10. The method of claim 9, wherein the plurality of sentences are ranked by a difficulty or discrimination level.

11. The method of claim 1, wherein the using includes modifying the sentence by removing the word to formulate the question.

12. The method of claim 11, further comprising outputting a set of selectable multiple choice answers selectable for responding to the output question, wherein similar words or synonyms are excluded from the set of multiple choice answers.

13. The method of claim 1, wherein additional questions are generated and output to the user, the question and the additional questions forming a round of questions.

14. The method of claim 13, wherein the question and additional questions are tailored to the user by asking the question and additional questions in a series of rounds, and the method further comprises tracking progress of the user based on a categorization of each question.

15. The method of claim 1, further comprising:
    automatically recognizing, and removing from a corpus of text that includes the sentence, boilerplate language.

16. The method of claim 1, wherein an electronic dictionary provides the definitions of the word, and wherein a sense is created that indicates a meaning of the word in a context of the sentence.

17. The method claim 1, further comprising:
    querying a corpus of words to determine a synonym or antonym of the word.

18. The method of claim 17, further comprising outputting a set of selectable multiple choice answers selectable for responding to the output question, wherein one of the set of multiple choice answers corresponds to the synonym of the word and additional synonyms are excluded from the set of multiple choice answers.

19. The method of claim 17, further comprising outputting a set of selectable multiple choice answers selectable for responding to the output question, wherein one of the set of multiple choice answers corresponds to the definition of the word, and similar definitions and definitions of a synonym of the word are excluded from the set of multiple choice answers.

20. The method of claim 17, further comprising outputting a set of selectable multiple choice answers selectable for responding to the output question, wherein one of the set of multiple choice answers corresponds to the antonym of the word, and other antonyms of the word are excluded from the set of multiple choice answers.

21. A computer-implemented method for generating vocabulary questions in an adaptive learning system, the method comprising:
    outputting, by a computer processor, questions in a series of rounds to a user, wherein each of the rounds contains a determined number of question slots;
    allocating a set of the question slots for questions previously missed by the user;
    distributing remaining question slots to additional questions concerning words about which the user previously correctly answered questions;
    subsequently determining whether any additional question slots are available; and
    if the determination is that there is one or more additional question slots available, allotting the available question slots to new questions containing words about which the user has not been tested.

22. The method of claim 21, wherein up to two questions slots are allocated for previously missed questions.

23. The method of claim 21, wherein new questions are only allotted in the question slots if the additional questions do not fill the remaining question slots.

24. The method of claim 21, wherein the remaining question slots are distributed according to a percentage distribution to follow-up questions testing different definitions of the words about which the user has previously correctly answered questions and mastery questions about words the user has previously mastered.

25. The method of claim 24, wherein 90% of the remaining question slots are distributed to the follow-up questions and 10% of the remainder is made up of the mastery questions.

26. The method of claim 21, wherein the questions are based on contained words in sentences stored in a database.

27. An adaptive learning system for generating questions and multiple choice answers to assist in teaching word comprehension, the system comprising:
    a computer processor configured to:
        obtain a sentence;
        determine whether a word of the obtained sentence, the word having multiple definitions, is used in the sentence consistently with one of the multiple definitions which has been selected as a target definition;
        responsive to a result of the determination being that the use of the word in the sentence is consistent with the one of the multiple definitions, provide the sentence for use to generate a question concerning the word of the sentence; and
        output the question and a set of selectable multiple choice answers.

28. The system of claim 27, wherein the computer processor retrieves text from an online content source, and analyzes at least one punctuation mark in the retrieved text to determine at last one boundary of the sentence in the retrieved text, the obtaining being in accordance with the determined at least one boundary.

29. The system of claim 7, wherein the computer processor parses the sentence to apply at least one marker for the definition of the word with which the use of the word in the is consistent.

30. The system of claim 29, wherein the sentence is retrievable based on the at least one definition marker.

31. The system of claim 27, wherein the computer processor assigns a priority to the sentence based on at least one of frequency of use of words of the sentence and likelihood of appearance of the words of the sentence on a standardized test.

32. The system of claim 31, wherein a plurality of sentences, including the sentence to which the priority was assigned, are reviewed in an order that is based on the assigned priority, during which the plurality of sentences are assigned to respective ones of a plurality of quality categories.

33. A hardware computer-readable medium having stored thereon instructions executable by a processor, the instructions which, when executed by the processor, cause the processor to perform a method for generating vocabulary questions, the method comprising:
    obtaining a sentence from a database;
    determining whether a word of the obtained sentence, the word having multiple definitions, is used in the sentence consistently with one of the multiple definitions which has been selected as a target definition;
    responsive to a result of the determining being that the use of the word in the sentence is consistent with the one of the multiple definitions, providing the sentence for use to generate a question concerning the word of the sentence; and
    outputting the question.

34. A computer-implemented method for generating vocabulary questions, the method comprising:
    obtaining, by a computer processor, a sentence from a database, the sentence having been assigned to one of a plurality of quality categories;
    using the sentence, by the computer processor, to generate a question concerning a word of the sentence, the question being one of a plurality of question types selected based on the quality category to which the sentence has been assigned; and
    outputting, by the computer processor, the question;
    wherein the quality category:
        corresponds to at least one ratio, each of the at least one ratio being of text, in the sentence, which is of a respective predetermined characteristic, relative to text, in the sentence, which is not of the respective predetermined characteristic, the predetermined characteristic being that the text at least one of includes a non-alphanumeric character and is an acronym; and
        is assigned such that the larger the at least one ratio of the text of the predetermined characteristic relative to the text that is not of the predetermined characteristic, the lower the quality category.

35. A computer-implemented method for generating vocabulary questions, the method comprising:
    obtaining, by a computer processor, a sentence from a database, the sentence having been assigned to one of a plurality of quality categories;
    using the sentence, by the computer processor, to generate a question concerning a word of the sentence, the question being one of a plurality of question types selected based on the quality category to which the sentence has been assigned; and
    outputting, by the computer processor, the question;
    wherein the quality category corresponds to both:
        (a) a determined degree to which the sentence has correctly applied the word; and
        (b) at least one of (i) at least one ratio, each of the at least one ratio being of text, in the sentence, which is of a respective predetermined characteristic, relative to text, in the sentence, which is not of the respective predetermined characteristic, the predetermined characteristic being that the text at least one of includes a non-alphanumeric character and is an acronym; and
(ii) a sentence length.

36. A computer-implemented method for generating vocabulary questions, the method comprising:
obtaining, by a computer processor, a sentence from a database, the sentence having been assigned to one of a plurality of quality categories;
using the sentence, by the computer processor, to generate a question concerning a word of the sentence, the question being one of a plurality of question types selected based on the quality category to which the sentence has been assigned; and
outputting, by the computer processor, the question;
wherein the quality category corresponds to the at least one ratio, each of the at least one ratio being of text, in the sentence, which is of a respective predetermined characteristic, relative to text, in the sentence, which is not of the respective predetermined characteristic, the predetermined characteristic being that the text is an acronym.

* * * * *